United States Patent
Xu et al.

(10) Patent No.: US 9,992,711 B2
(45) Date of Patent: Jun. 5, 2018

(54) METHOD AND APPARATUS FOR PERFORMING DUAL CONNECTIVITY IN HETEROGENEOUS NETWORK

(71) Applicant: LG Electronics Inc., Seoul (KR)

(72) Inventors: Jian Xu, Seoul (KR); Kyungmin Park, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 14/760,574

(22) PCT Filed: Oct. 28, 2014

(86) PCT No.: PCT/KR2014/010181
§ 371 (c)(1),
(2) Date: Jul. 13, 2015

(87) PCT Pub. No.: WO2015/065010
PCT Pub. Date: May 7, 2015

(65) Prior Publication Data
US 2015/0358866 A1 Dec. 10, 2015

Related U.S. Application Data

(60) Provisional application No. 61/896,612, filed on Oct. 28, 2013, provisional application No. 61/898,476, filed on Nov. 1, 2013.

(51) Int. Cl.
*H04W 36/00* (2009.01)
*H04W 36/08* (2009.01)
(Continued)

(52) U.S. Cl.
CPC ....... *H04W 36/0061* (2013.01); *H04W 36/00* (2013.01); *H04W 36/0027* (2013.01);
(Continued)

(58) Field of Classification Search
CPC ............. H04W 36/0061; H04W 36/38; H04W 36/0027; H04W 36/08; H04W 76/02;
(Continued)

(56) References Cited

U.S. PATENT DOCUMENTS 8,504,043 B2 *  8/2013  Wu .................. H04W 36/0022
                                                    370/331
9,237,497 B2 *  1/2016  Jha ........................ H04W 48/04
(Continued)

FOREIGN PATENT DOCUMENTS

CN      102833802 A    12/2012
EP       2713653 A1     4/2014
(Continued)

OTHER PUBLICATIONS

Catt: "Signaling Impact over S1/Xn", R1-131711, 3GPP TSG RAN WG3#81bis, Venice, Italy, Oct. 7-11, 2013.
(Continued)

*Primary Examiner* — Brian O'Connor
(74) *Attorney, Agent, or Firm* — Dentons US LLP

(57) ABSTRACT

The present invention provides a method for performing dual connectivity operation in a heterogeneous network.
In the method, a first eNB transmits a first message to a second eNB for the dual connectivity operation, and receives a response for the first message from the second eNB.
The response includes E-RAB (E-UTRAN Radio Access Bearer) related information.

19 Claims, 21 Drawing Sheets

(51) Int. Cl.
| | |
|---|---|
| *H04W 36/38* | (2009.01) |
| *H04W 68/00* | (2009.01) |
| *H04W 76/02* | (2009.01) |
| *H04W 72/04* | (2009.01) |
| *H04W 36/14* | (2009.01) |
| *H04W 68/02* | (2009.01) |
| *H04W 36/02* | (2009.01) |

(52) U.S. Cl.
CPC ........... *H04W 36/08* (2013.01); *H04W 36/38* (2013.01); *H04W 68/00* (2013.01); *H04W 76/02* (2013.01); *H04W 36/02* (2013.01); *H04W 36/14* (2013.01); *H04W 68/02* (2013.01); *H04W 72/042* (2013.01); *H04W 72/0406* (2013.01)

(58) Field of Classification Search
CPC ... H04W 68/00; H04W 36/00; H04W 72/042; H04W 36/02; H04W 72/0406; H04W 36/14; H04W 68/02
See application file for complete search history.

(56) References Cited

U.S. PATENT DOCUMENTS

| | | | | |
|---|---|---|---|---|
| 9,479,973 | B2* | 10/2016 | Centonza | H04W 76/045 |
| 9,510,248 | B2* | 11/2016 | Teyeb | H04W 76/045 |
| 9,544,865 | B2* | 1/2017 | Qu | H04W 4/02 |
| 9,614,652 | B2* | 4/2017 | Wager | H04L 5/0035 |
| 9,681,352 | B2* | 6/2017 | Vesely | H04W 36/30 |
| 9,699,825 | B2* | 7/2017 | Lee | H04W 56/00 |
| 9,756,531 | B2* | 9/2017 | Park | H04W 76/025 |
| 2004/0166843 | A1 | 8/2004 | Hahn | |
| 2008/0270611 | A1 | 10/2008 | Noldus et al. | |
| 2009/0290540 | A1 | 11/2009 | Cherian et al. | |
| 2011/0019644 | A1 | 1/2011 | Cheon et al. | |
| 2014/0171054 | A1* | 6/2014 | Cai | H04W 76/04 455/418 |
| 2015/0009915 | A1* | 1/2015 | Baek | H04W 36/00 370/329 |
| 2015/0038140 | A1* | 2/2015 | Kilpatrick, II | H04W 64/00 455/436 |
| 2015/0038143 | A1* | 2/2015 | Kilpatrick, II | H04W 64/00 455/436 |
| 2015/0350962 | A1* | 12/2015 | Futaki | H04B 7/024 370/331 |
| 2016/0057684 | A1* | 2/2016 | Larsson | H04W 36/26 370/331 |
| 2016/0105832 | A1* | 4/2016 | Wu | H04W 36/14 455/439 |
| 2016/0366719 | A1* | 12/2016 | Yamada | H04W 76/025 |

FOREIGN PATENT DOCUMENTS

| | | |
|---|---|---|
| WO | 2011137784 A1 | 11/2011 |
| WO | 2012159529 A1 | 11/2012 |
| WO | 2013121492 | 8/2013 |

OTHER PUBLICATIONS

Alcatel-Lucent: "Control Panel Architecture for Small Cell Enhancement dual connectivity", R1-131742, 3GPP TSG RAN WG3 Meeting #81bis, Venice, Italy, Oct. 7-11, 2013.
Intel Corporation: "Further discussion and comparison between CP architecture options C1 and C2", 3GPP TSG-RAN2 Meeting #83, R2-132820, Aug. 19-23, 2013.
Potevio: "Inter-eNB handover for Carrier Aggregation", 3GPP TSG RAN WG2 #70, R2-102769, May 10-14, 2010.
Ericsson: "Overall procedures for offloading over Xn" 3GPP TSG-RAN WG2 Meeting #81bis, R3-131794, Oct. 7-19, 2013.
ZTE Corporation: "Discussion and control plane issues", 3GPP TSG-RAN2 Meeting #83bis, R2-133145, Oct. 7-11, 2013.
NTT DOCOMO, "Introduction of Dual Connectivity," R3-142122, 3GPP TSG RAN WG3 Meeting #85bis, Shanghai, China, Oct. 6-10, 2014.
ZTE Corporation, "Discussion on Control Plane Issues," R2-133145, 3GPP TSG-RAN2 Meeting #83bis, Ljubljana, Slovenia, Oct. 7-11, 2013.
Catt, "Signaling Impact over S1/Xn," R3-131711, 3GPP TSG RAN WG3 #81bis, Venice, Italy, Oct. 7-11, 2013.
Ericsson, "Overall Procedures for Offloading over Xn," R3-131794, 3GPP TSG-RAN WG2 Meeting #81bis, Venice, Italy, Oct. 7-19, 2013.
RAN3, "Changes to TS36.300 agreed in RAN3#61bis and RAN3#62," R2-087450, 3GPP TSG-RAN WG3 Meeting #64, Prague, Czech Republic, Nov. 10-14, 2008.

* cited by examiner

[Figure 1]
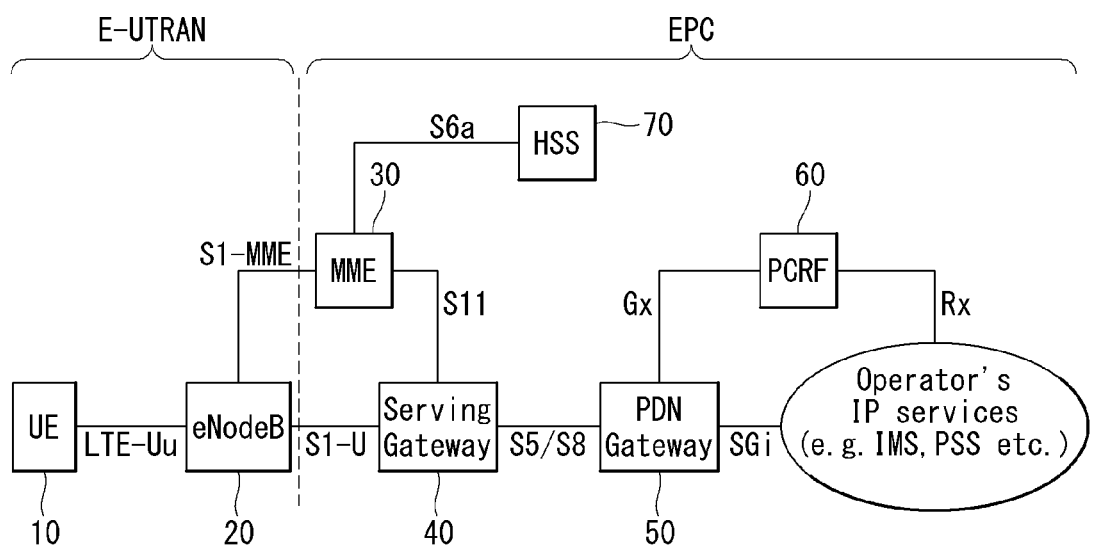

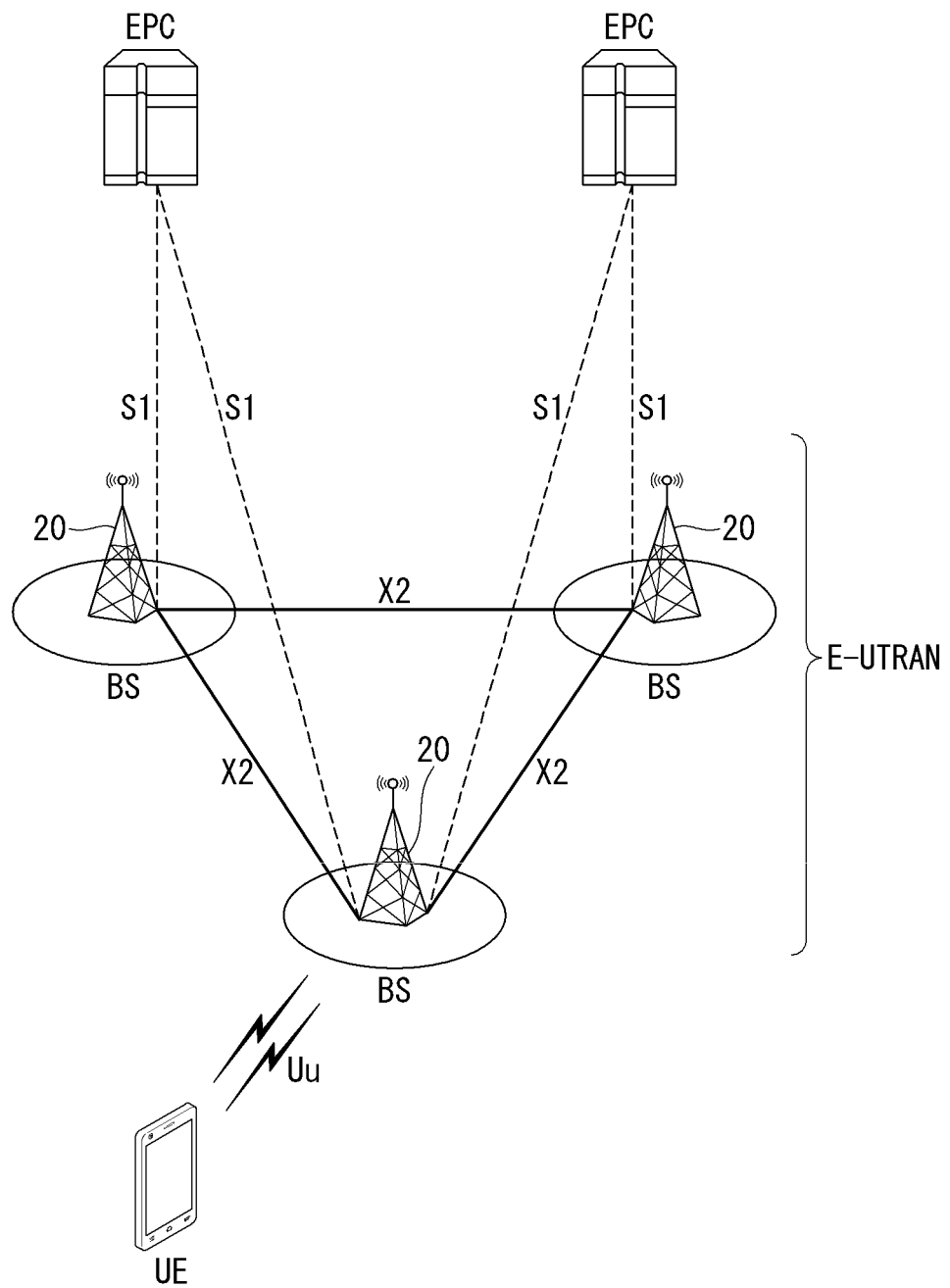
[Figure 2]

[Figure 3]
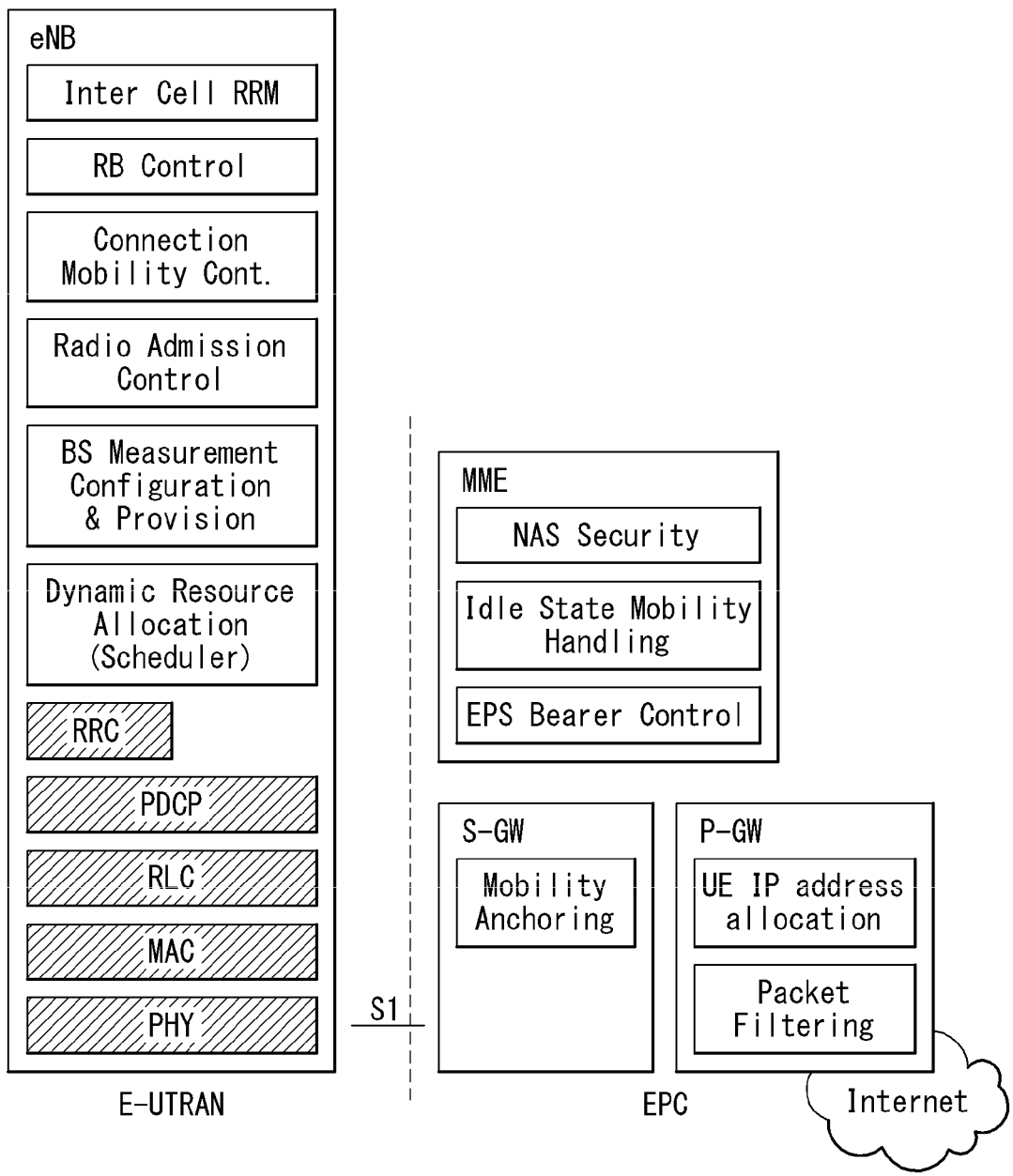

【Figure 4】
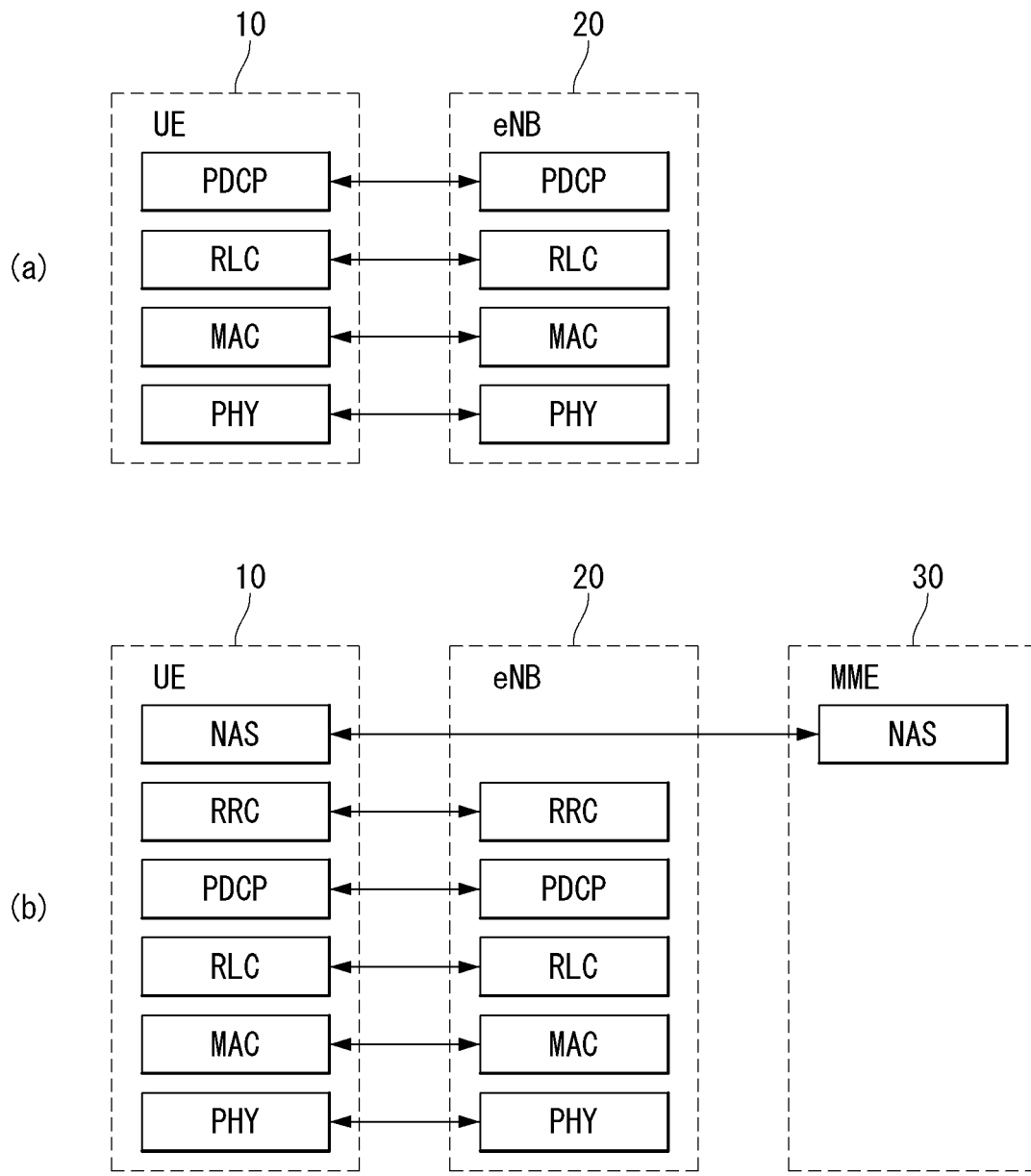

【Figure 5】
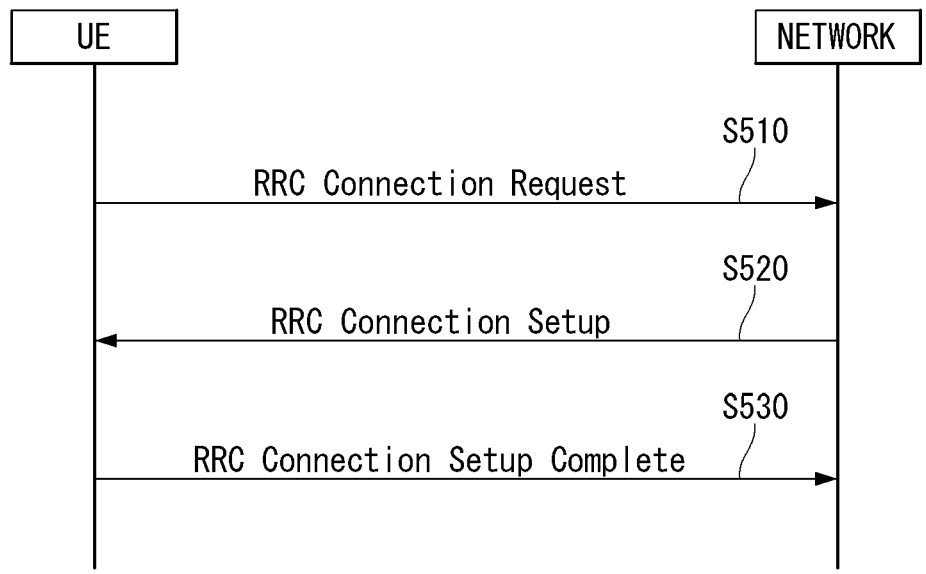
【Figure 6】
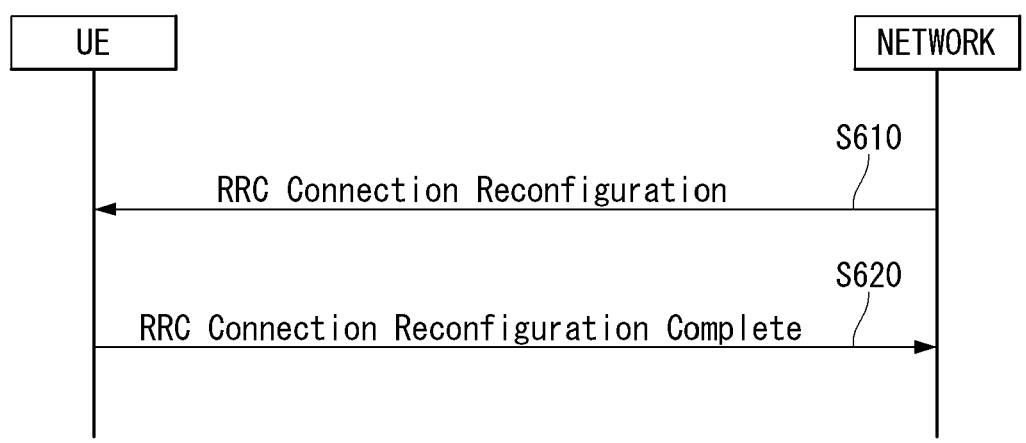

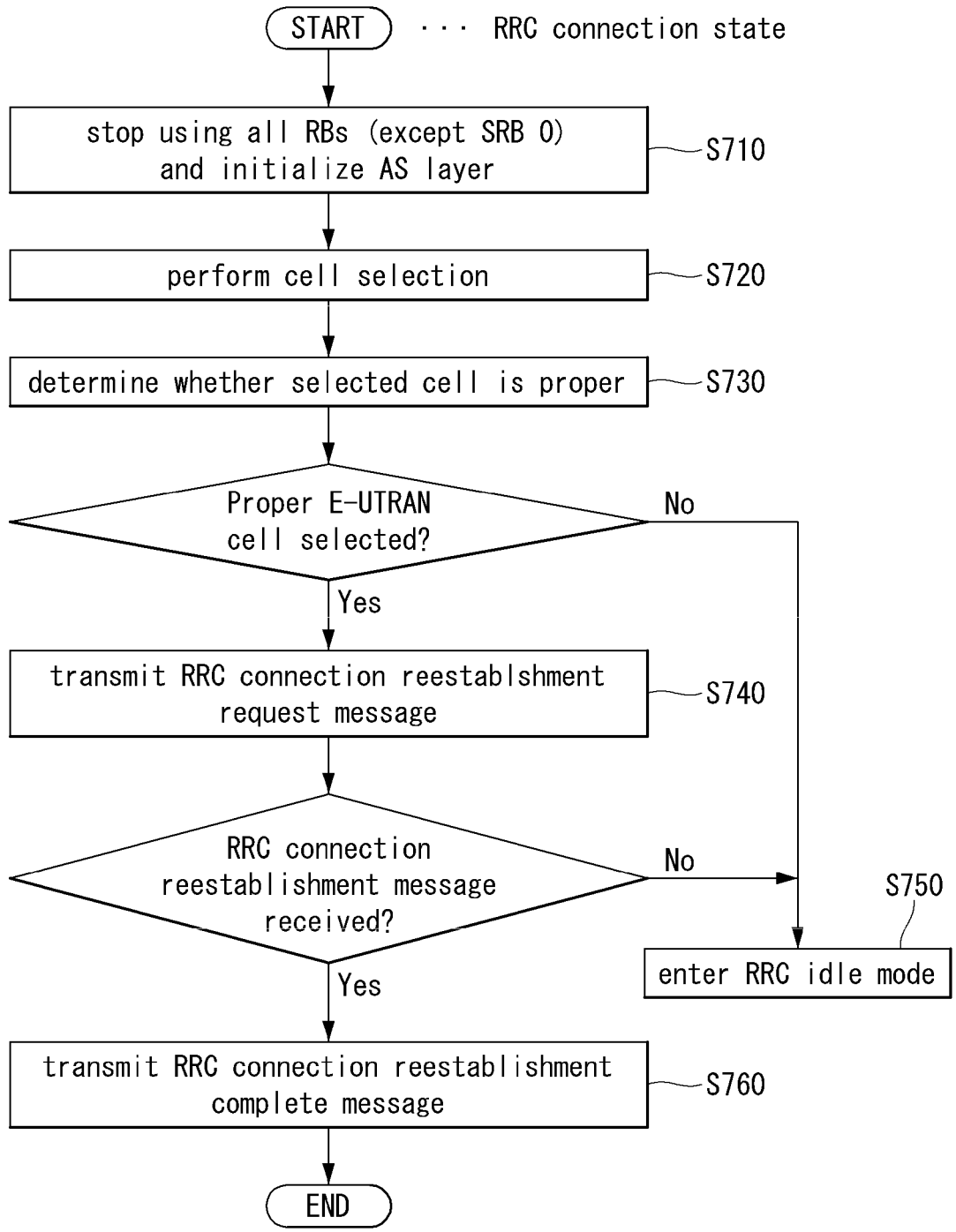
[Figure 7]

[Figure 8]
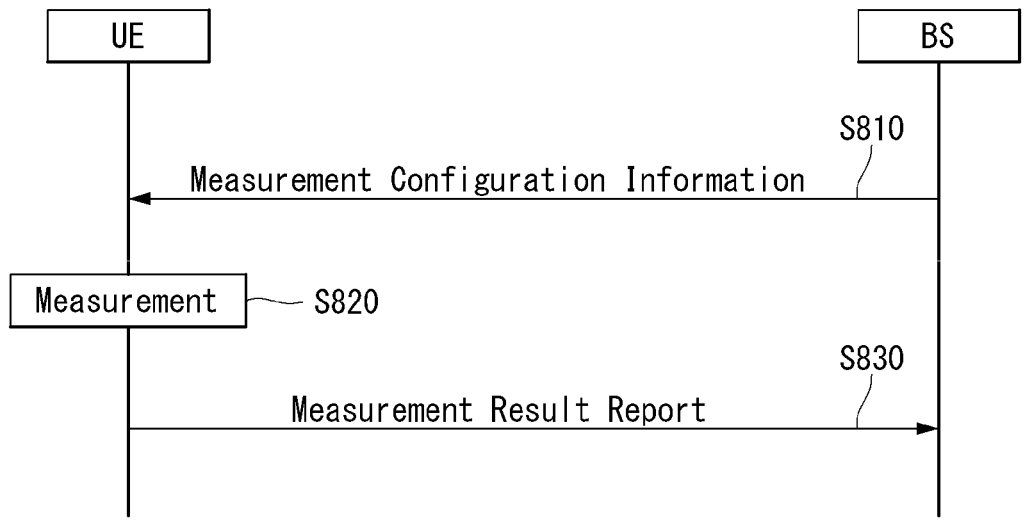
[Figure 9]
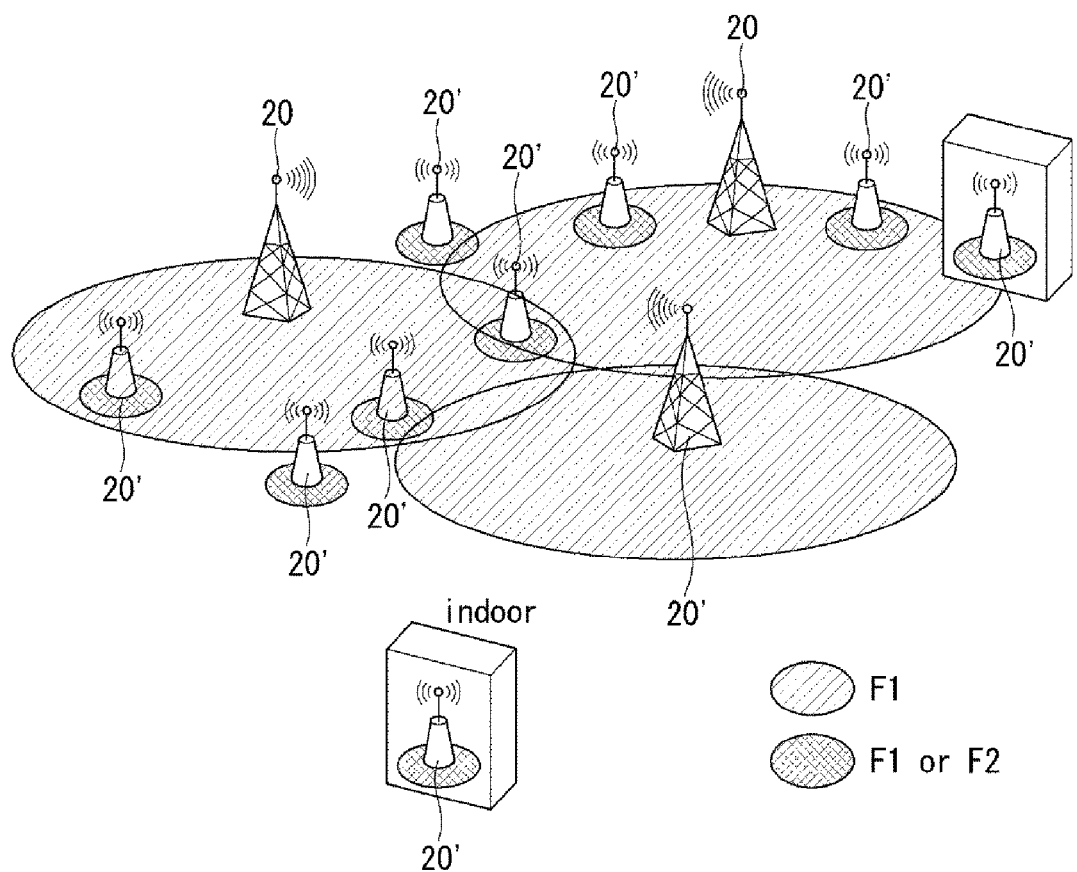

[Figure 10]
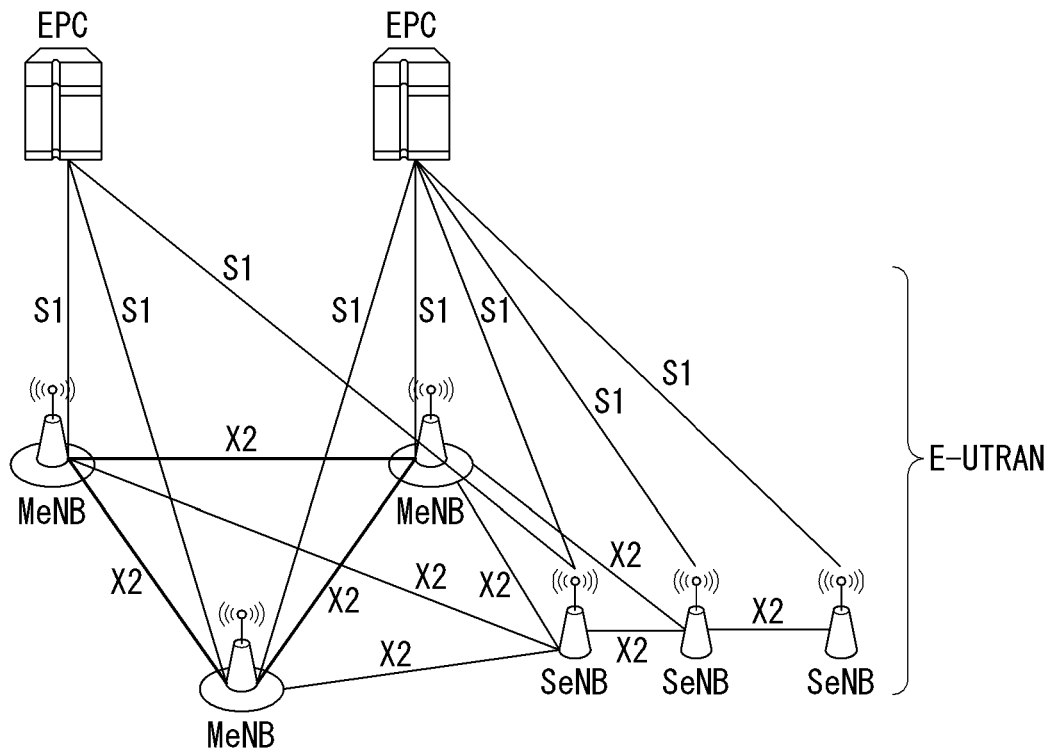
[Figure 11]
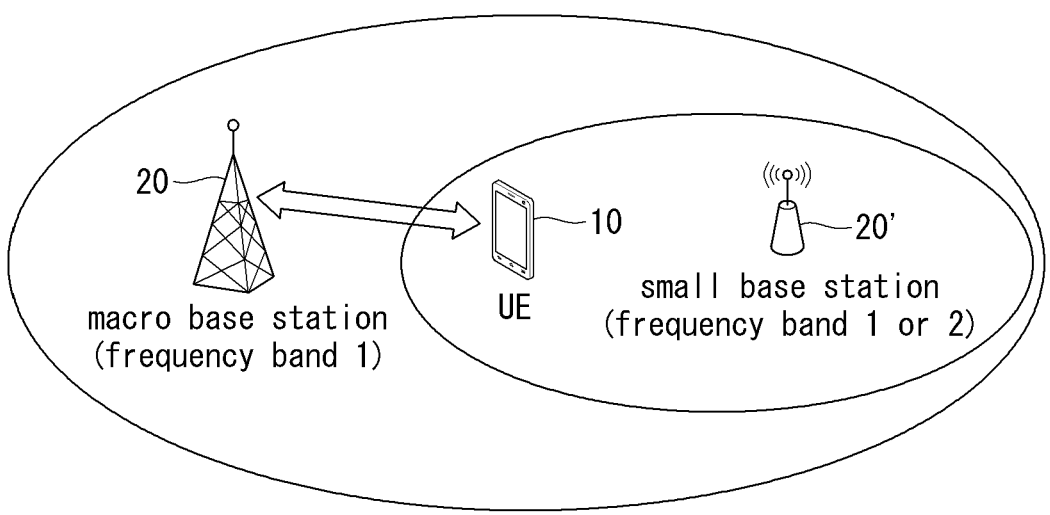

【Figure 12】
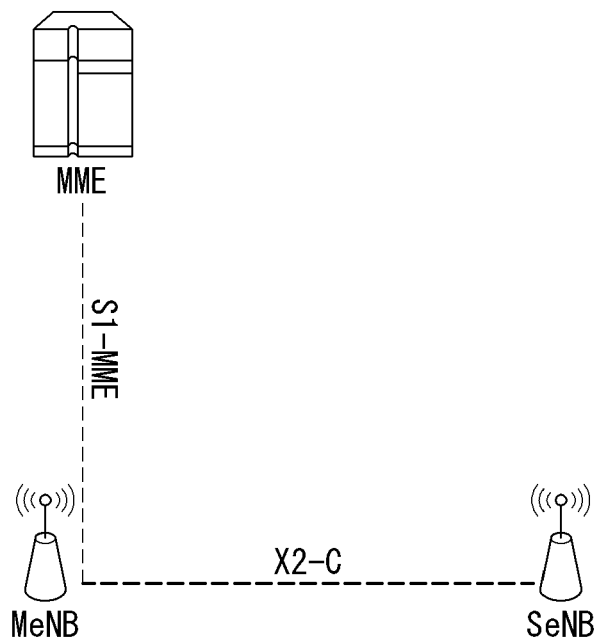
【Figure 13】
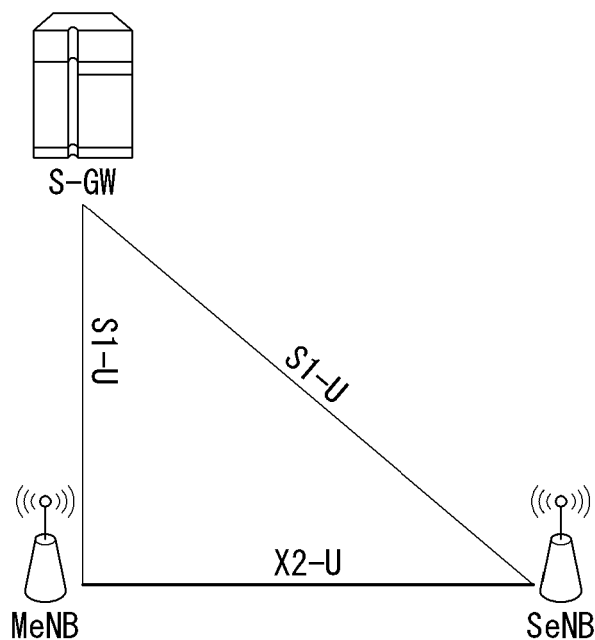

【Figure 14】
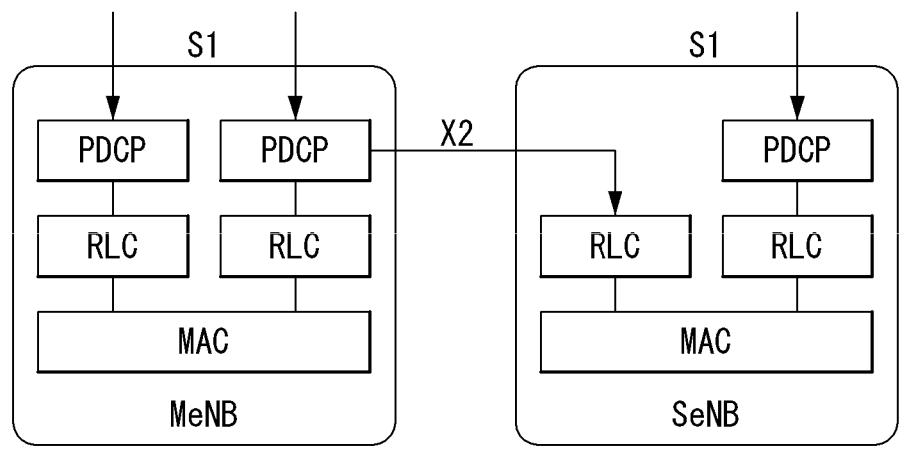
【Figure 15】
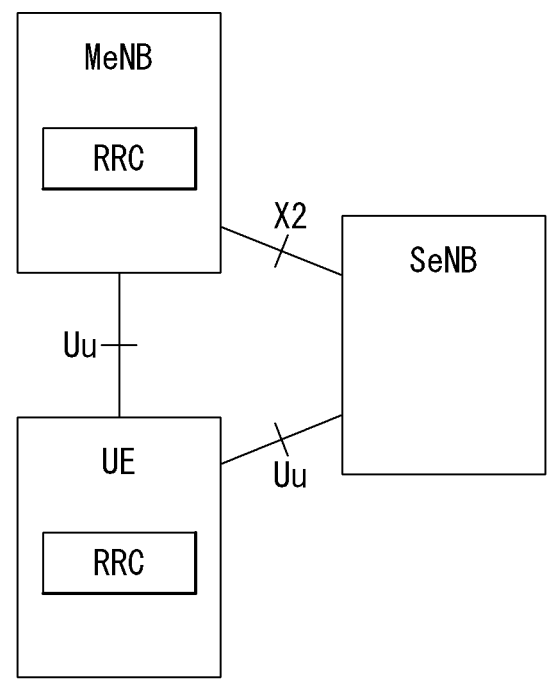

【Figure 16】
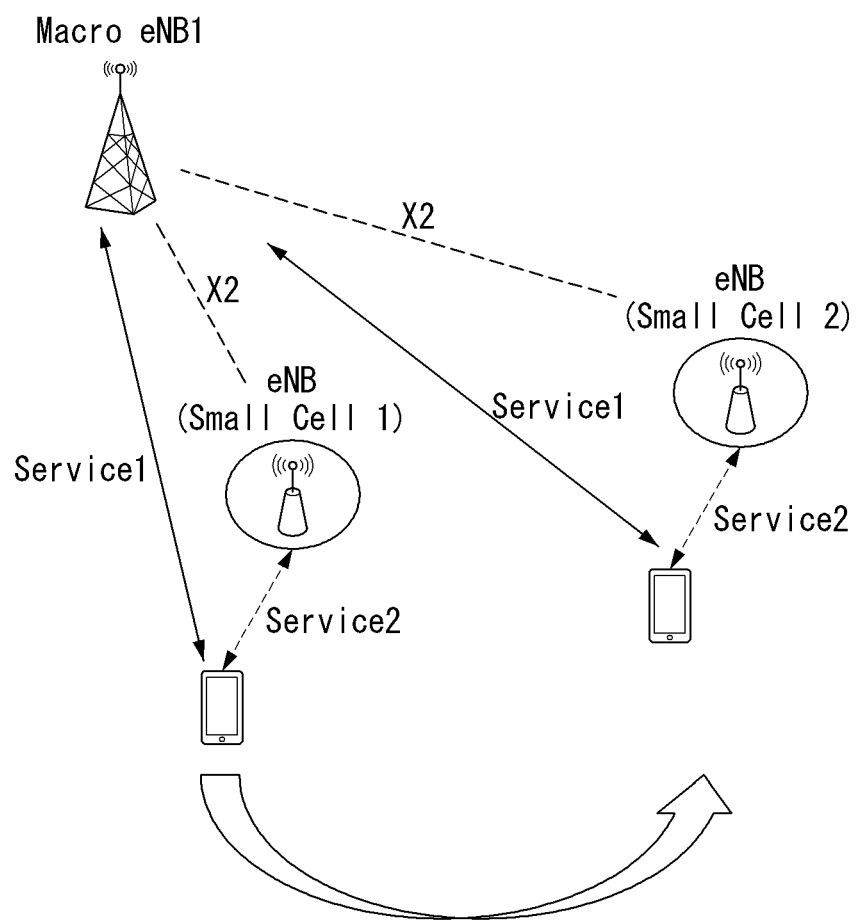

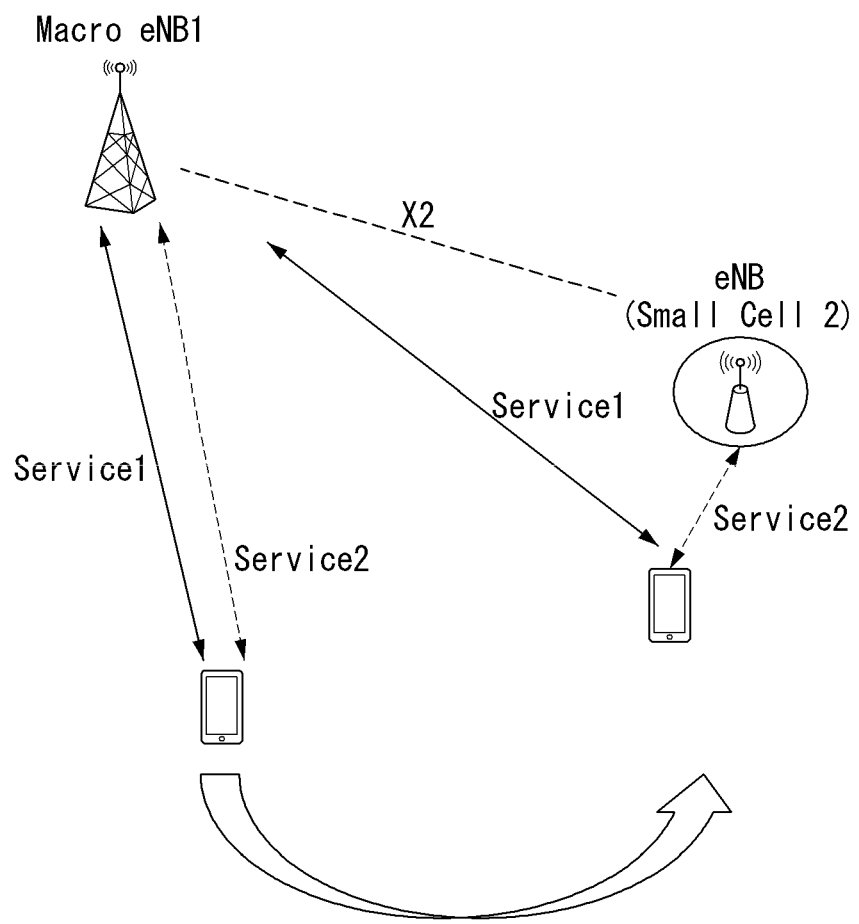
[Figure 17]

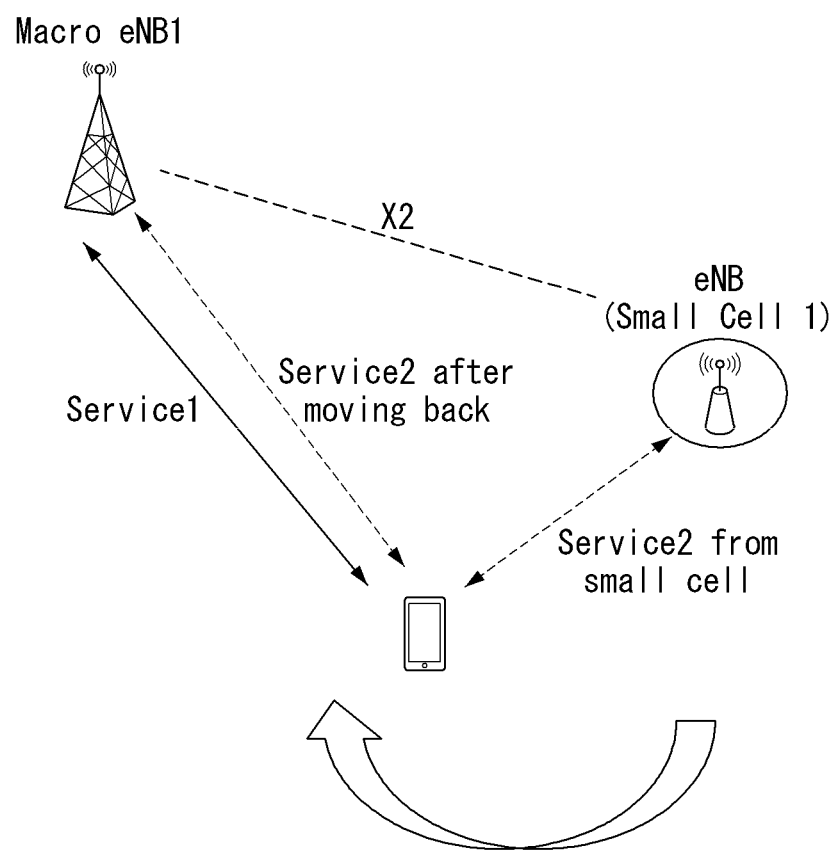
[Figure 18]

[Figure 19]
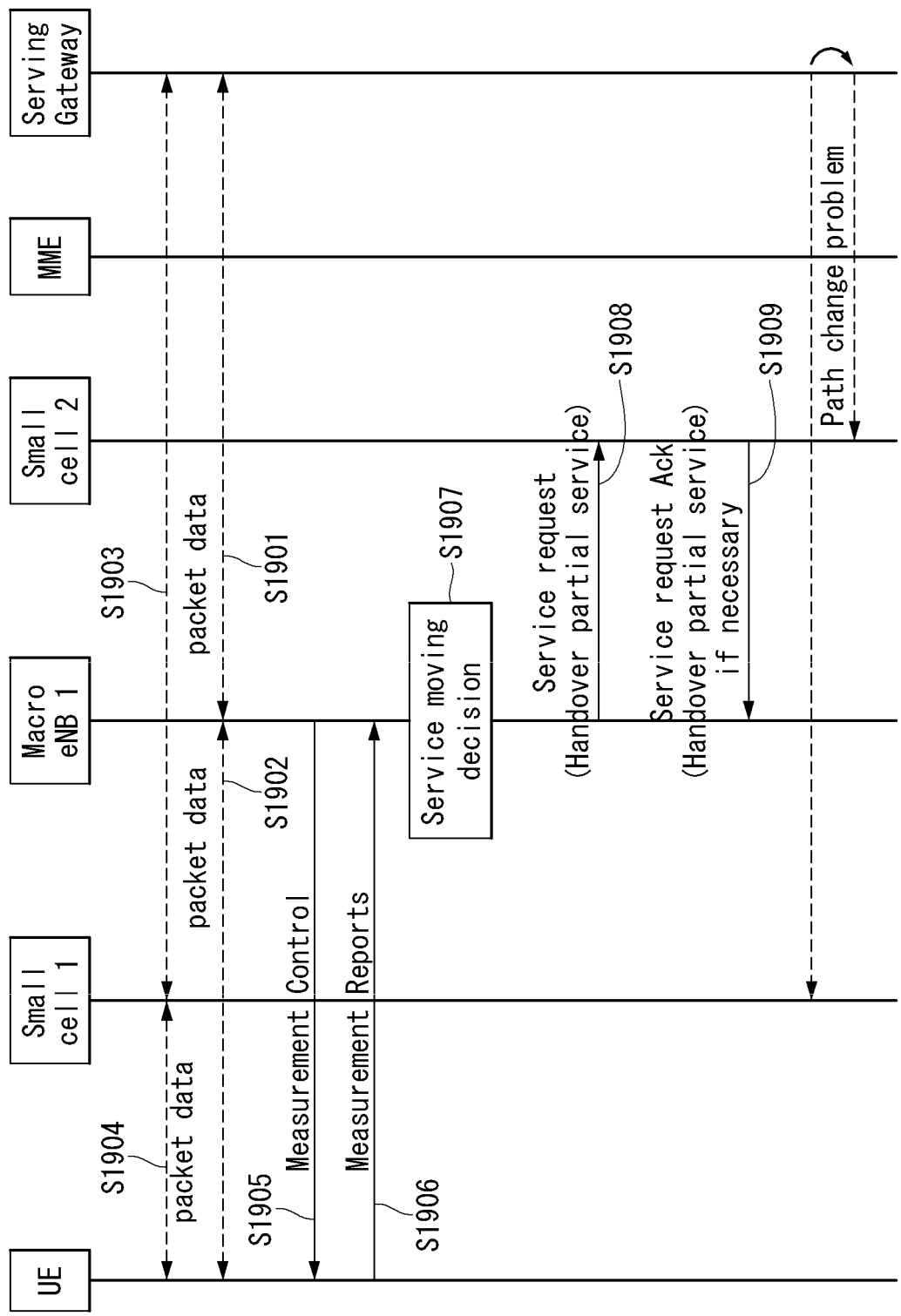

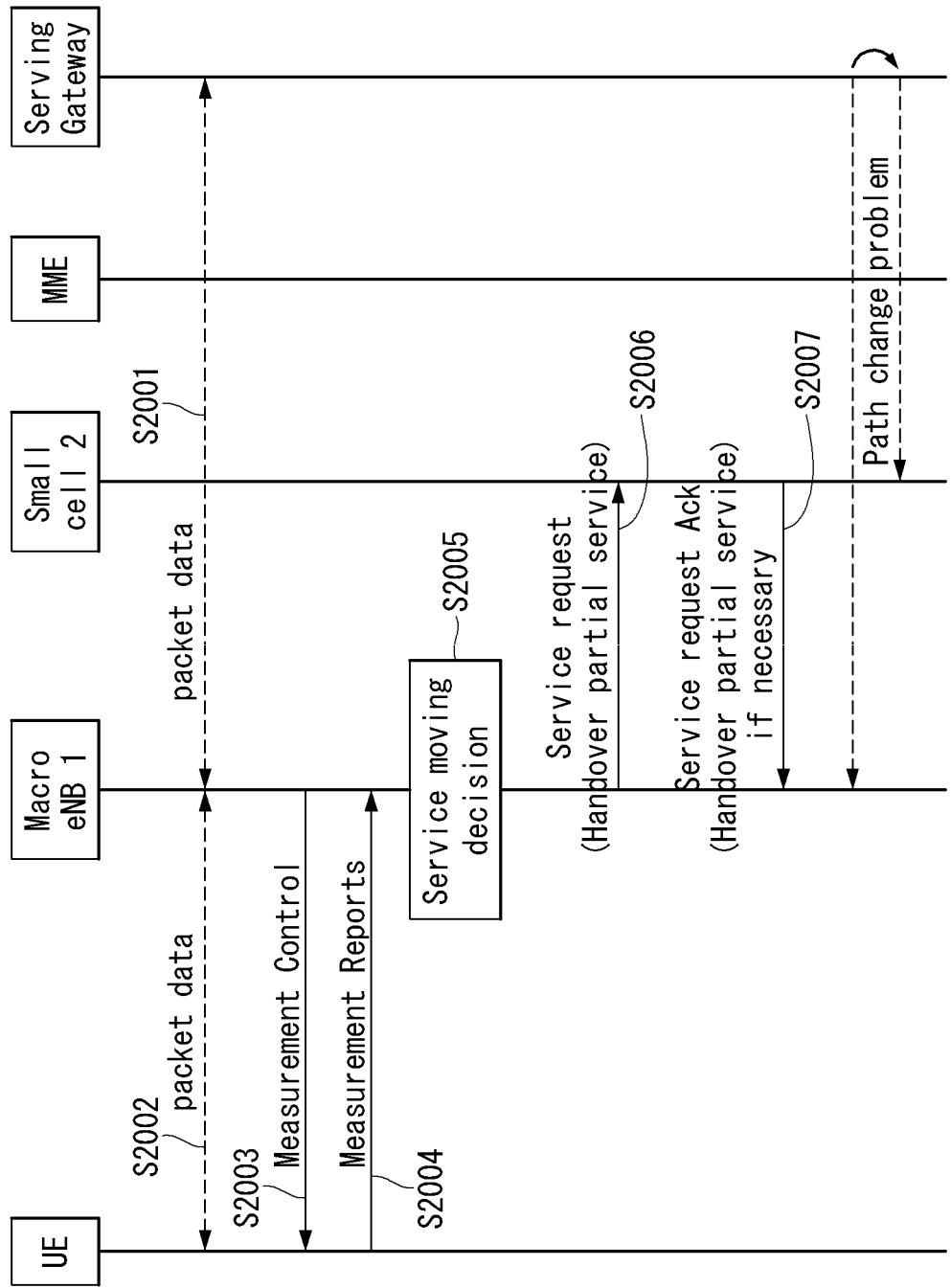
[Figure 20]

[Figure 21]
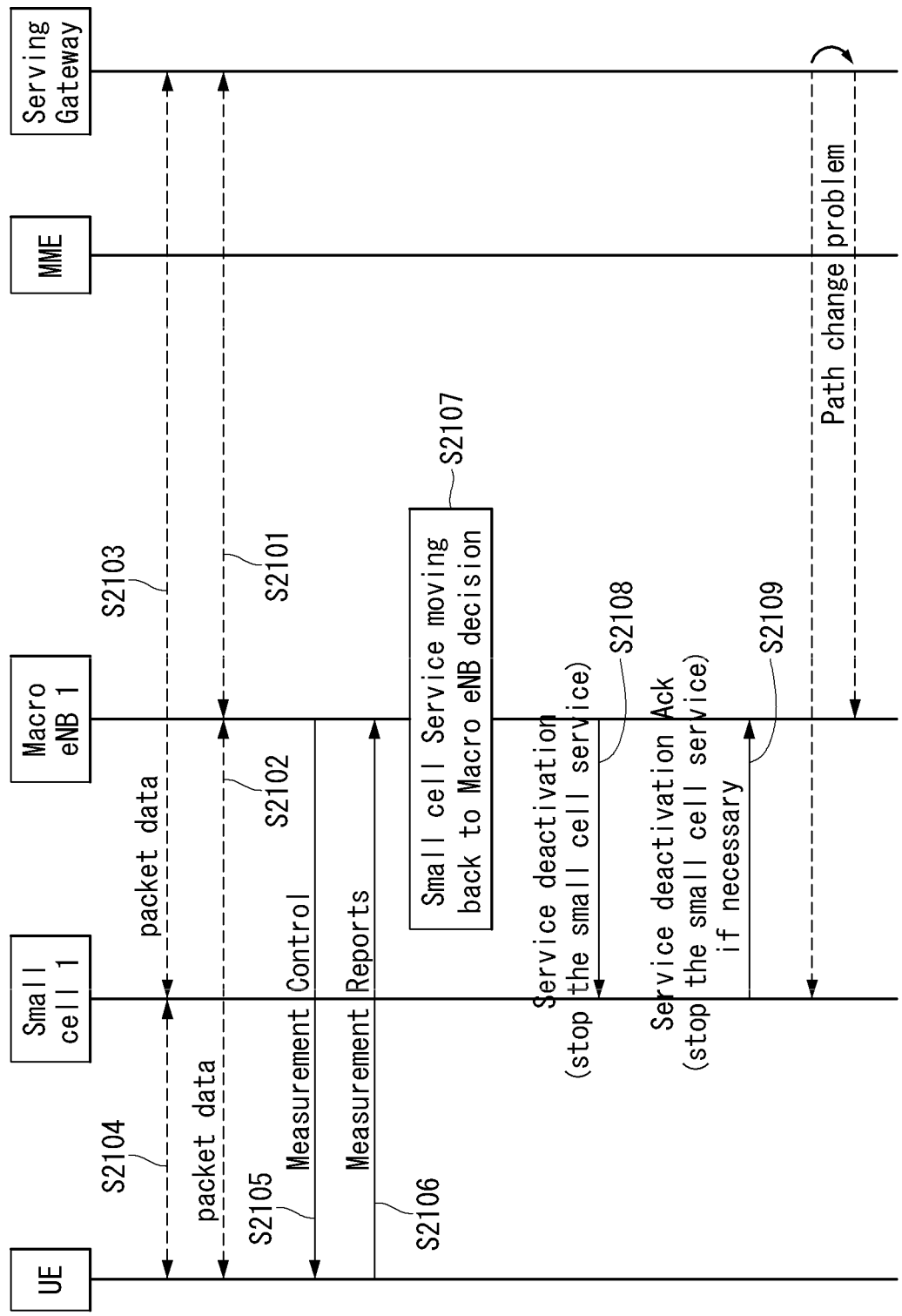

[Figure 22]
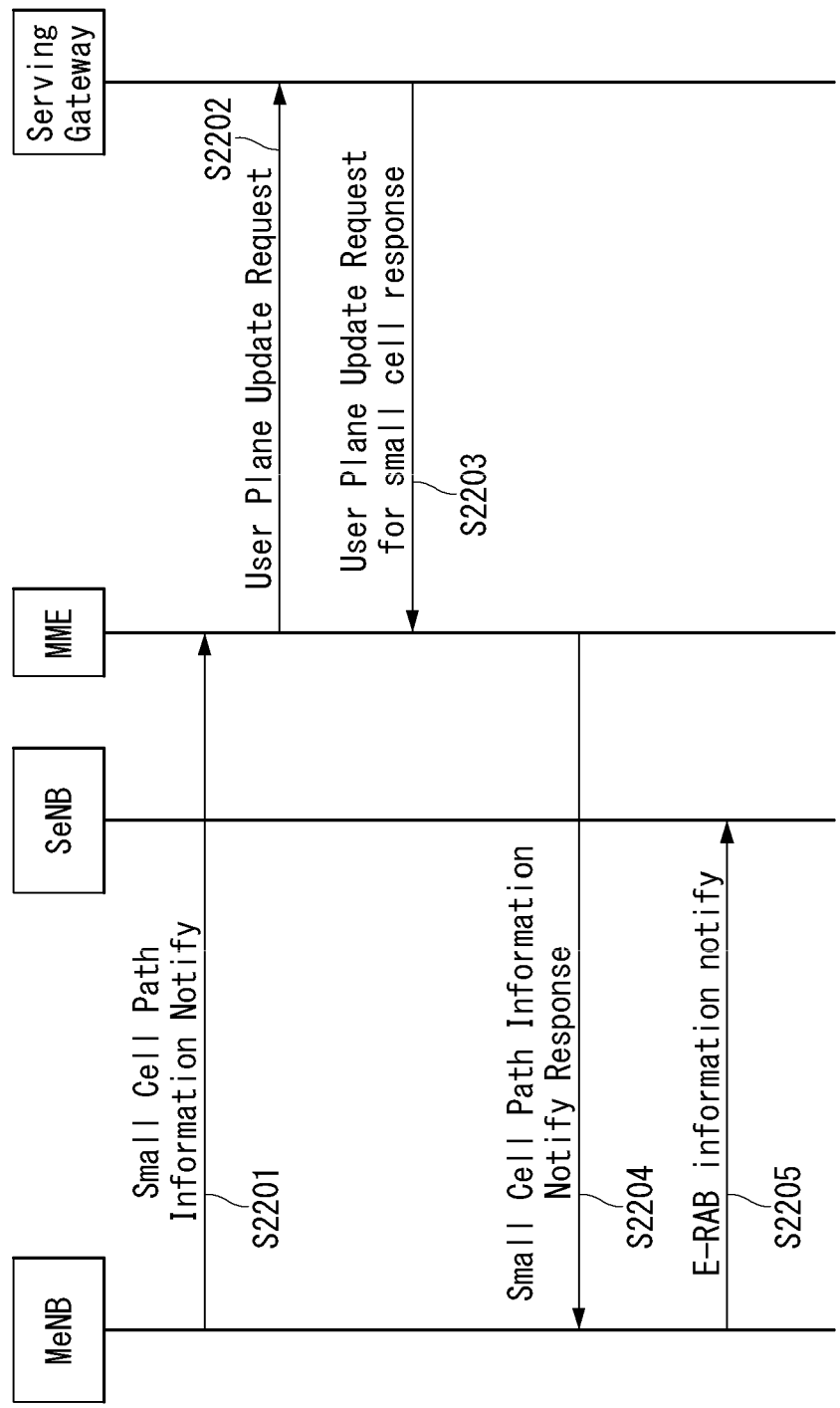

[Figure 23]
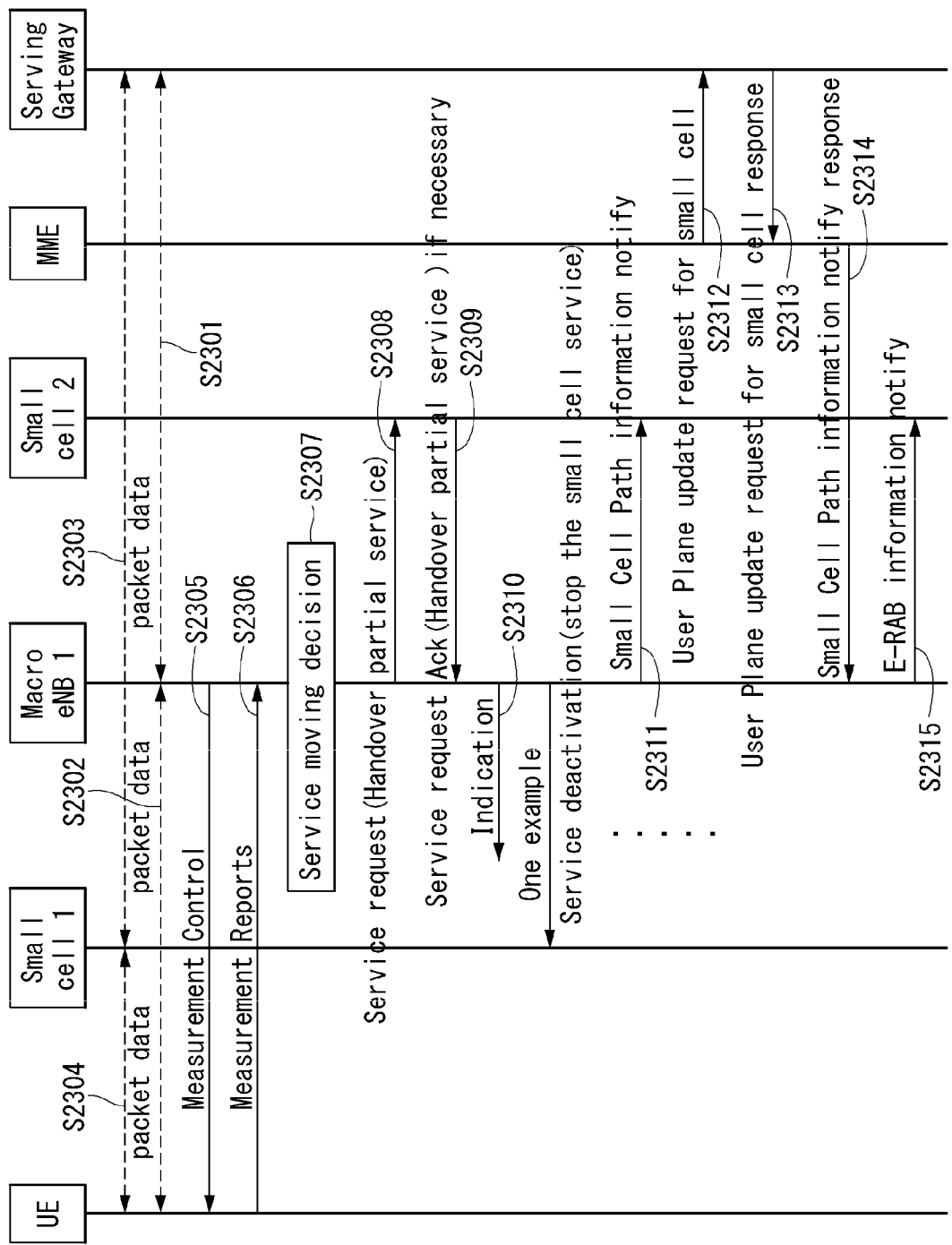

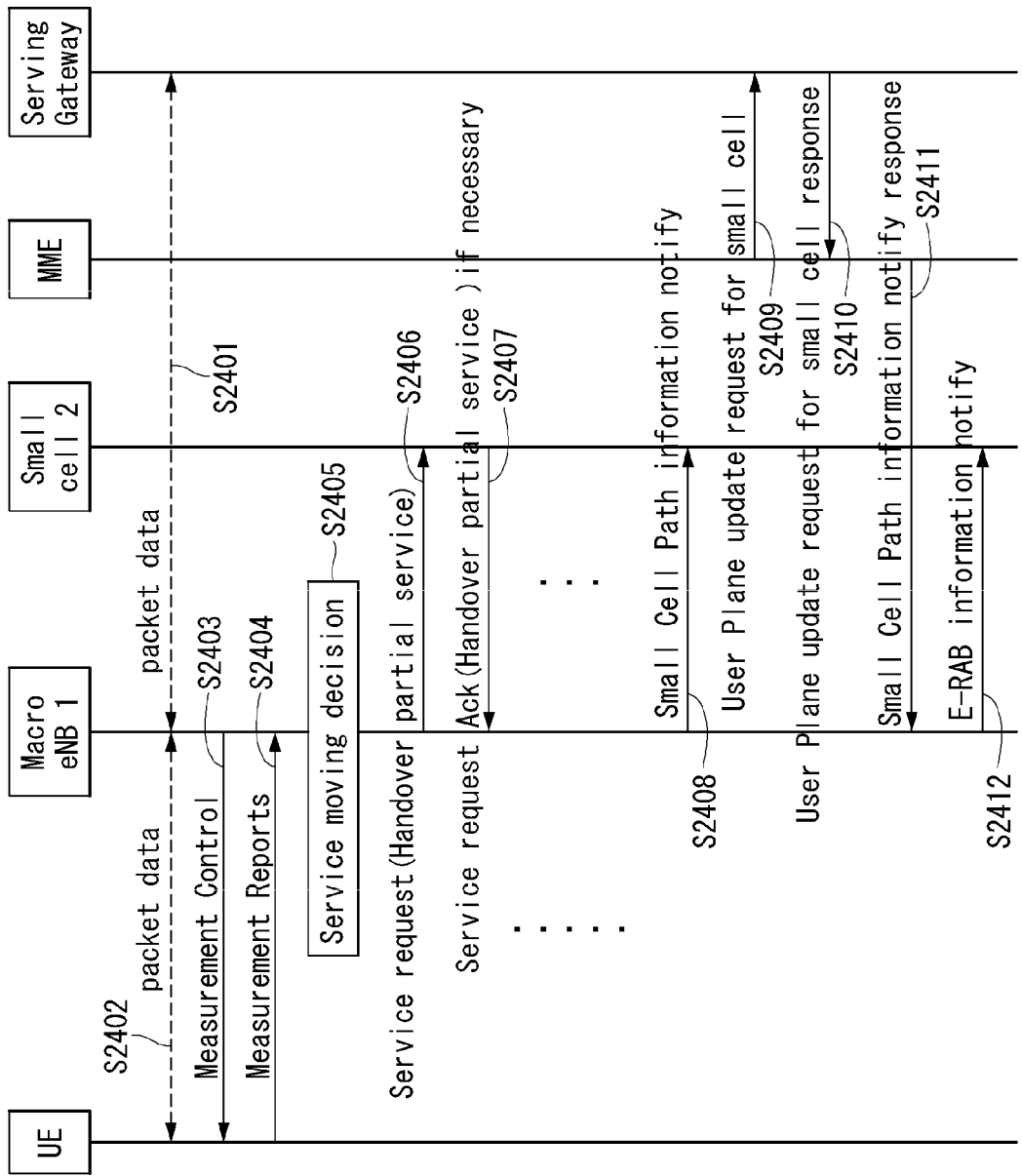
[Figure 24]

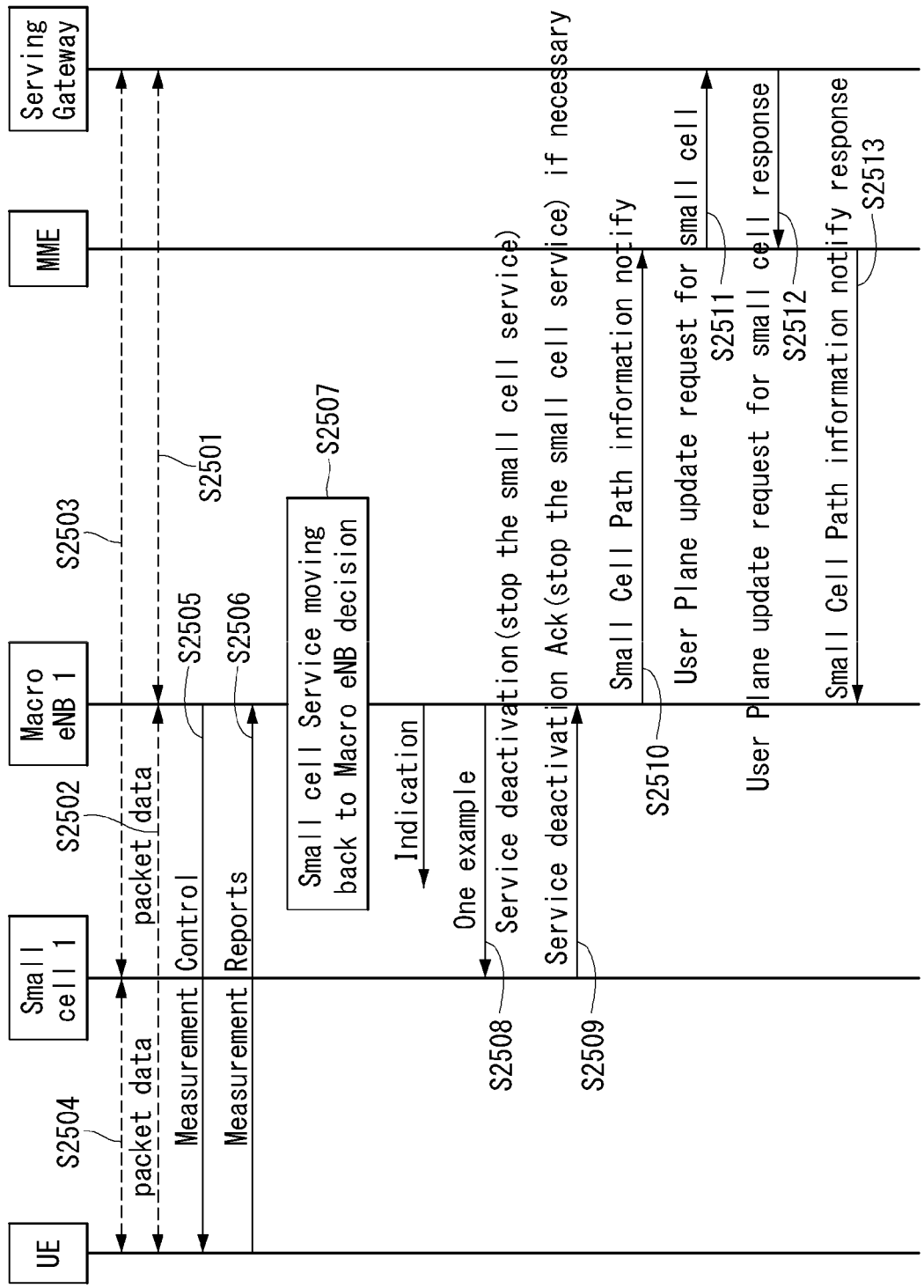
[Figure 25]

[Figure 26]
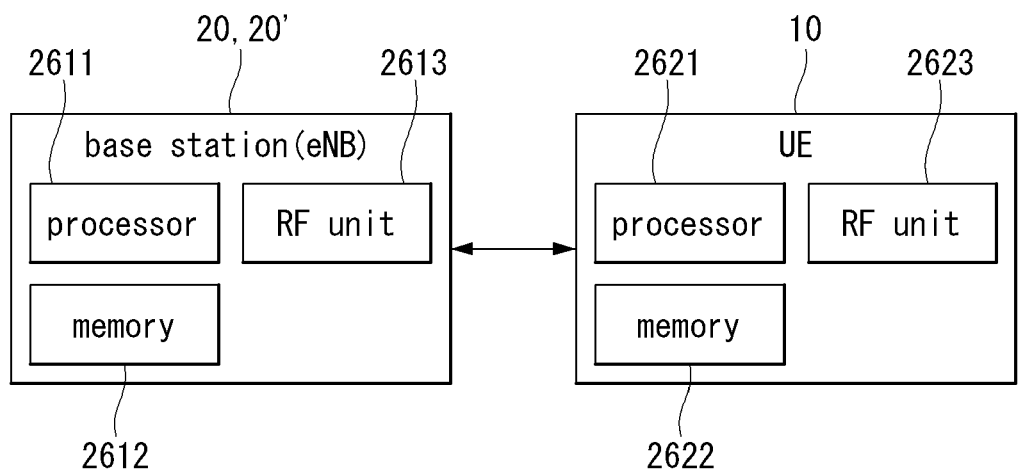

METHOD AND APPARATUS FOR PERFORMING DUAL CONNECTIVITY IN HETEROGENEOUS NETWORK

This application is a 35 USC §371 National Stage entry of International Application No. PCT/KR2014/010181 filed on Oct. 28, 2014, and claims priority to U.S. Provisional Application Nos. 61/896,612 filed on Oct. 28, 2013 and 61/898,476 filed on Nov. 1, 2013, all of which are hereby incorporated by reference in their entireties as if fully set forth herein.

TECHNICAL FIELD

The present invention relates to a method and apparatus for performing operations relating to dual connectivity (DC) in a heterogeneous network (HN).

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

An object of the present specification is to provide an enhanced network operation for efficiently supporting a dual connectivity operation in a heterogeneous network.

Another object of the present specification is to provide a method for supporting a dual connectivity operation by moving a service provided by a small cell (or SeNB) to another small cell (or SeNB) in a heterogeneous network.

Still another object of the present specification is to provide a method for supporting a dual connectivity operation by moving at least one service provided by a macro cell (or MeNB) to a small cell (or SeNB) in a heterogeneous network.

Yet another object of the present specification is to provide a method for supporting a dual connectivity operation by moving a service provided by a small cell (or SeNB) to a macro cell (or MeNB) in a heterogeneous network.

The technical problems solved by the present invention are not limited to the above technical problems and those skilled in the art may understand other technical problems from the following description.

Technical Solution

This disclosure provides a method for performing dual connectivity operation by a first eNB in a heterogeneous network, the method comprising: transmitting a first message to a second eNB for the dual connectivity operation; and receiving a response for the first message from the second eNB, wherein the response includes E-RAB (E-UTRAN Radio Access Bearer) related information, wherein the E-RAB related information includes at least one of an E-RAB ID field indicating E-RABs admitted to be added, changed or released, a transport layer address field indicating an IP address used for user plane transmission or a GTP (General Packet Radio Service Tunneling Protocol)-TEID (Tunnel Endpoint Identifier) field used for user plane transmission.

The method further comprises transmitting a second message for notifying service user plane path change to an MME (Mobility Management Entity); and receiving a response for the second message from the MME.

The second message includes at least one of information relating to E-RABs switched in downlink item IEs (Information Elements), ID of a cell or an eNB providing a service after service movement, ID of a cell or an eNB providing the service prior to service movement or indication for notifying the MME that the second message is user plane path change information.

The information relating to E-RABs switched in downlink item IEs includes at least one of an E-RAB ID field indicating E-RAB admitted to be added, changed or released, a transport layer address field indicating an IP address used for user plane transmission or a GTP-TEID field used for user plane transmission.

The response for the second message includes at least one of information relating to E-RABs switched in uplink item IEs or an E-RAB list released in the uplink item IEs, wherein the released E-RAB list is included when an EPC (Evolved Packet Core) has not performed user plane path change in at least one E-RAB.

The information relating to E-RABs switched in uplink item IEs includes at least one of an E-RAB ID field indicating E-RAB admitted to be added, changed or released, a transport layer address field indicating an IP address used for user plane transmission or a GTP-TEID field used for user plane transmission.

The first message is a service request message or a secondary eNB (SeNB) addition request message and the response to the first message is service request ACK or SeNB addition acknowledgement.

The second message is a small cell path information notify message and the response to the second message is a small cell path information notify response message.

The method further comprises exchanging service related packet data with a serving gateway; exchanging the service related packet data with a UE; and performing a measurement procedure with the UE.

The method further comprises comprising determining moving of at least one of services provided to the UE to the second eNB.

The method further comprises determining moving of a service of the second eNB to another second eNB; and transmitting a third message requesting service deactivation to the second eNB.

The method further comprises determining moving of a service of the second eNB to the first eNB; and transmitting a fourth message requesting service deactivation to the second eNB.

The first eNB is an MeNB (Master eNB) and the second eNB is an SeNB (Secondary eNB).

The method further comprises transmitting an E-RAB information notify message to the second eNB.

The E-RAB information notify message includes an E-RAB to be changed in an uplink list or an E-RAB to be released list.

This disclosure provides a method for performing dual connectivity operation by a first eNB in a heterogeneous network, the method comprising: receiving a first message from a second eNB for the dual connectivity operation; and transmitting a response for the first message to the second eNB, wherein the response includes E-RAB (E-UTRAN Radio Access Bearer) related information, wherein the E-RAB related information includes at least one of an E-RAB ID field indicating E-RABs admitted to be added, changed or released, a transport layer address field indicating an IP address used for user plane transmission or a GTP (General Packet Radio Service Tunneling Protocol)-TEID (Tunnel Endpoint Identifier) field used for user plane transmission.

This disclosure provides a radio apparatus operating in a heterogeneous network, the radio apparatus comprising: a communication unit configured to transmit and/or receive a radio signal to and/or from the outside; and a processor functionally connected with the communication unit, wherein the processor is configured to transmit a first message to a second eNB for the dual connectivity operation and to receive a response for the first message from the second eNB, wherein the response includes E-RAB (E-UTRAN Radio Access Bearer) related information, wherein the E-RAB related information includes at least one of an E-RAB ID field indicating E-RABs admitted to be added, changed or released, a transport layer address field indicating an IP address used for user plane transmission or a GTP (General Packet Radio Service Tunneling Protocol)-TEID (Tunnel Endpoint Identifier) field used for user plane transmission.

The processor is configured to transmit a second message for notifying service user plane path change to an MME and to receive a response to the second message from the MME.

Advantageous Effects

It is possible to support dual connectivity operations of a UE by defining a procedure for notifying an EPC of service path change when a service is moved between eNBs in a heterogeneous network.

The effects of the present invention are not limited to the above-described effects and other effects which are not described herein will become apparent to those skilled in the art from the following description.

DESCRIPTION OF DRAWINGS

FIG. 1 illustrates an exemplary EPS (Evolved Packet System) relating to an LTE system to which the present invention is applicable.

FIG. 2 illustrates a wireless communication system to which the present invention is applied.

FIG. 3 is a block diagram showing an example of functional split between an E-UTRAN and an EPC to which the present invention is applicable.

FIG. 4A is a block diagram showing an exemplary radio protocol architecture for a user plane to which the technical feature of the specification is applicable.

FIG. 4B is a block diagram showing an exemplary radio protocol architecture for a control plane to which the technical feature of the specification is applicable.

FIG. 5 is a flowchart illustrating a procedure of establishing RRC connection to which the present invention is applicable.

FIG. 6 is a flowchart illustrating an RRC connection re-establishment procedure to which the present invention is applicable.

FIG. 7 illustrates an exemplary RRC connection re-establishment procedure to which the present invention is applicable.

FIG. 8 is a flowchart illustrating an exemplary measurement method to which the present invention is applicable.

FIG. 9 illustrates an exemplary heterogeneous network including macro eNBs and small eNBs to which the present invention is applicable.

FIG. 10 illustrates an exemplary wireless communication system for operating small eNBs to which the present invention is applicable.

FIG. 11 is a conceptual diagram showing an example of deployment of a UE and base stations in a heterogeneous network system to which the present invention is applicable.

FIG. 12 illustrates a Control Plane for Dual Connectivity in E-UTRAN.

FIG. 13 illustrates a User Plane architecture for Dual Connectivity in E-UTRAN.

FIG. 14 illustrates an architecture of a radio interface protocol for Dual Connectivity between the E-UTRAN and a UE.

FIG. 15 illustrates a control plane architecture for Dual Connectivity in E-UTRAN.

FIG. 16 illustrates an example of a use case relating to service movement to which methods provided in the specification are applicable.

FIG. 17 illustrates an example of another use case relating to service movement to which methods provided in the specification are applicable.

FIG. 18 illustrates an example of another use case relating to service movement to which methods provided in the specification are applicable.

FIG. 19 illustrates an example of service path change problem that can be generated in the use case of FIG. 16.

FIG. 20 illustrates an example of service path change problem that can be generated in the use case of FIG. 17.

FIG. 21 illustrates an example of service path change problem that can be generated in the use case of FIG. 18.

FIG. 22 is a flowchart illustrating an example of a method for enabling service movement between eNBs in a heterogeneous network environment provided in the specification.

FIG. 23 is a flowchart illustrating an example of a method for performing service movement to another small cell in a heterogeneous network environment provided in the specification.

FIG. 24 is a flowchart illustrating an example of a method for performing service movement from a macro eNB to a small eNB in a heterogeneous network environment provided in the specification.

FIG. 25 is a flowchart illustrating an example of a method for performing service movement from a small eNB to a macro eNB in a heterogeneous network environment provided in the specification.

FIG. 26 is a block diagram showing a radio apparatus in which methods provided in the specification can be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4A is a diagram illustrating a radio protocol architecture for a user plane. FIG. 4B is a diagram illustrating a radio protocol architecture for a control plane. The user plane is a protocol stack for user data transmission. The control plane is a protocol stack for control signal transmission.

Referring to FIGS. 4A and 4B, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

FIG. 5 is a flowchart showing an RRC connection establishment procedure to which the present invention can be applied.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) 'User Equipment (UE) procedures in idle mode (Release 8)', a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.)

Intra-frequency cell reselection: A reselected cell is a cell having the same center-frequency and the same RAT as those used in a cell on which the UE is currently being camped.)

Inter-frequency cell reselection: A reselected cell is a cell having the same RAT and a different center-frequency with respect to those used in the cell on which the UE is currently being camped.)

Inter-RAT cell reselection: A reselected cell is a cell using a different RAT from a RAT used in the cell on which the UE is currently being camped.

Hereinafter, the RRC connection reestablishment procedure is described in greater detail.

FIG. 7 is a view illustrating an example RRC connection reestablishment procedure to which the present invention can be applied.

Referring to FIG. 7, the terminal stops using all the radio bearers configured except for SRB 0 (Signaling Radio Bearer #0) and initializes various sub-layers of the AS (Access Stratum) (S710). Further, the terminal sets each sub-layer and physical layer as a default configuration. During such process, the terminal maintains the RRC connection state.

The terminal performs a cell selection procedure for performing the RRC connection reestablishment procedure (S720). During the RRC connection reestablishment procedure, the cell selection procedure may be performed like a cell selection procedure performed by the terminal in RRC idle mode even when the terminal maintains the RRC connection state.

After performing the cell selection procedure, the terminal identifies system information of a corresponding cell to determine whether the corresponding cell is a proper cell (S730). In case the selected cell is a proper E-UTRAN cell, the terminal sends a RRC connection reestablishment request message to the corresponding cell (S740).

Meanwhile in case the cell selected through the cell selection procedure for performing the RRC connection reestablishment procedure is a cell using other RAT than E-UTRAN, the terminal stops the RRC connection reestablishment procedure and enters the RRC idle mode (S750).

The terminal may be implemented so that the cell selection procedure and identifying whether the cell is proper through receiving the system information of the selected cell are complete within a limited time. To that end, the terminal may run a timer as the RRC connection reestablishment procedure is initiated. The timer may pause when the terminal is determined to have selected a proper cell. In case the timer expires, the terminal considers the RRC connection reestablishment procedure as failing and may enter the RRC idle mode. This timer is hereinafter referred to as a radio link failure timer. In LTE spec. TS 36.331, a timer named T311 may be utilized as the radio link failure timer. The terminal may obtain setting values of the timer from the system information of a serving cell.

When receiving the RRC connection reestablishment request message from the terminal and accepting the request, the cell sends a RRC connection reestablishment message to the terminal.

When receiving the RRC connection reestablishment message from the cell, the terminal reconfigures a PDCP sub-layer and an RLF sub-layer on SRB1. Further, the terminal recalculates various key values relating to security configuration and reconfigures the PDCP sub-layer responsible for security with the newly calculated security key values.

By doing so, SRB 1 is opened between the terminal and the cell so that RRC control messages may be communicated. The terminal completes resumption of SRB1 and sends to the cell an RRC connection reestablishment complete message indicating the RRC connection reestablishment procedure has been complete (S760).

In contrast, when receiving the RRC connection reestablishment request message from the terminal and not accepting the request, the cell sends a RRC connection reestablishment reject message to the terminal.

If the RRC connection reestablishment procedure is successfully performed, the cell and the terminal perform a RRC connection reestablishment procedure. By doing so, the terminal restores to the state before the RRC connection reestablishment procedure is performed and maximally assures service continuity.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.)

FIG. 8 is a flowchart showing a method of performing measurement to which the present invention can be applied.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) 'Evolved Universal Terrestrial Radio Access (E-UTRA) Radio Resource Control (RRC); Protocol specification (Release 8)'.)

TABLE 1

| Event | Reporting Condition |
| --- | --- |
| Event A1 | Serving becomes better than threshold |
| Event A2 | Serving becomes worse than threshold |

TABLE 1-continued

| Event | Reporting Condition |
| --- | --- |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

FIG. 10 shows an example of a wireless communication system for operating a small eNB to which the present invention can be applied. Referring to FIG. 10, the small eNB (SeNB) gateway (SeNB GW) can be operated to provide a service to the SeNB as described above. SeNBs are connected to an EPC directly or via the SeNB GW. An MME regards the SeNB GW as a typical eNB. Further, the SeNB regards the SeNB GW as the MME. Therefore, the SeNB and the SeNB GW are connected by means of an S1 interface, and also the SeNB GW and the EPC are connected by means of the S1 interface. Furthermore, even in a case where the SeNB and the EPC are directly connected, they are connected by means of the S1 interface. A function of the SeNB is almost similar to a function of the typical eNB.

In general, the SeNB has radio transmission output power lower than that of an eNB owned by a mobile network vendor. Therefore, in general, the coverage provided by the SeNB is smaller than the coverage provided by the eNB. Due to such characteristics, a cell provided by the SeNB is often classified as a femto cell in contrast to a macro cell provided by the eNB from the perspective of the coverage.

With and without Macro Coverage

Small cell enhancement considers both with and without macro coverage.

More specifically, Small cell enhancement is considered the deployment scenario in which small cell nodes are deployed under the coverage of one or more than one overlaid E-UTRAN macro-cell layer(s) in order to boost the capacity of already deployed cellular network.

Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Ideal and Non-Ideal Backhaul

Small cell enhancement considers both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Dual Connectivity

In the heterogeneous networks which supports small cell enhancement, there are various requirements related to mobility robustness, increased signaling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface.

The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group.

Here, "cell group" is a group of serving cells associated with either the Master eNB (MeNB) or the Secondary eNB (SeNB) in dual connectivity.

"Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

Here, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 12 illustrates Control Plane for Dual Connectivity in E-UTRAN.

Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Referring to the FIG. 12, the MeNB is C-plane connected to the MME via S1-MME, the MeNB and the SeNB are interconnected via X2-C.

FIG. 13 illustrates User Plane architecture for Dual Connectivity in E-UTRAN.

FIG. 13 shows U-plane connectivity of eNBs involved in dual connectivity for a certain UE. U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

FIG. 14 illustrates architecture of radio interface protocol for Dual Connectivity between the E-UTRAN and a UE.

In Dual Connectivity, the radio protocol architecture that a particular bearer uses depends on how the bearer is setup. Three alternatives exist, MCG bearer, SCG bearer and split bearer. That is, some bearers (e.g., SCG bearers) of a UE may be served by the SeNB while others (e.g., MCG bearers) are only served by the MeNB. Also, some bearers (e.g., split bearers) of a UE may be split while others (e.g., MCG bearers) are only served by the MeNB. Those three alternatives are depicted on FIG. 14.

In case that MCG bearer and/or SCG bearer is setup, S1-U terminates the currently defined air-interface U-plane protocol stack completely per bearer at a given eNB, and is tailored to realize transmission of one EPS bearer by one node. The transmission of different bearers may still happen simultaneously from the MeNB and a SeNB.

In case that split bearer is setup, S1-U terminates in MeNB with the PDCP layer residing in the MeNB always. There is a separate and independent RLC bearer (SAP above RLC), also at UE side, per eNB configured to deliver PDCP PDUs of the PDCP bearer (SAP above PDCP), terminated at the MeNB. The PDCP layer provides PDCP PDU routing for transmission and PDCP PDU reordering for reception for split bearers in DC.

SRBs are always of the MCG bearer and therefore only use the radio resources provided by the MeNB. Here, DC can also be described as having at least one bearer configured to use radio resources provided by the SeNB.

FIG. 15 illustrates Control plane architecture for Dual Connectivity in E-UTRAN.

Each eNB should be able to handle UEs autonomously, i.e., provide the PCell to some UEs while acting as assisting eNB for other. It is assumed that there will be only one S1-MME Connection per UE.

In dual connectivity operation, the SeNB owns its radio resources and is primarily responsible for allocating radio resources of its cells. Thus, some coordination is still needed between MeNB and SeNB to enable this.

At least the following RRC functions are relevant when considering adding small cell layer to the UE for dual connectivity operation:

Small cell layer's common radio resource configurations
Small cell layer's dedicated radio resource configurations
Measurement and mobility control for small cell layer In dual connectivity operation, a UE always stays in a single RRC state, i.e., either RRC_CONNECTED or RRC_IDLE.

Referring the FIG. 15, only the MeNB generates the final RRC messages to be sent towards the UE after the coordination of RRM functions between MeNB and SeNB. The UE RRC entity sees all messages coming only from one entity (in the MeNB) and the UE only replies back to that entity. L2 transport of these messages depends on the chosen UP architecture and the intended solution.

The following general principles are applied for the operation of dual connectivity.

1. The MeNB maintains the RRM measurement configuration of the UE and may, e.g., based on received measurement reports or traffic conditions or bearer types, decide to ask an SeNB to provide additional resources (serving cells) for a UE.

2. Upon receiving the request from the MeNB, an SeNB may create the container that will result in the configuration of additional serving cells for the UE (or decide that it has no resource available to do so).

3. The MeNB and the SeNB exchange information about UE configuration by means of RRC containers (inter-node messages) carried in Xn messages. Here, the Xn interface can be an X2 interface in LTE/LTE-A system.

4. The SeNB may initiate a reconfiguration of its existing serving cells (e.g., PUCCH towards the SeNB).

5. The MeNB does not change the content of the RRC configuration provided by the SeNB.

As stated above, small cell architectures and operations are being discussed, especially focusing on dual connectivity of UEs to a macro cell (or MeNB) and a small cell (or SeNB). In the present invention, enhanced methods are shown for network operations considering UE's dual connectivity.

In Dual Connectivity, the configured set of serving cells for a UE consists of two subsets, the Master Cell Group (MCG) containing the serving cells of the MeNB, and the Secondary Cell Group (SCG) containing the serving cells of the SeNB.

With respect to the interaction between MeNB and SeNB, the following principles are applied.

The MeNB maintains the RRM measurement configuration of the UE. And the MeNB may, e.g., based on received measurement reports or traffic conditions or bearer types, decide to ask a SeNB to provide additional resources (serving cells) for a UE.

Upon receiving the request from the MeNB, a SeNB may create the container that will result in the configuration of additional serving cells for the UE (or decide that it has no resource available to do so).

For UE capability coordination, the MeNB provides (part of) the AS-configuration and the UE capabilities to the SeNB. The MeNB and the SeNB exchange information about UE configuration by means of RRC containers (inter-node messages) carried in Xn messages (e.g., X2 message).

The SeNB may initiate a reconfiguration of its existing serving cells (e.g., PUCCH towards the SeNB). The SeNB decides pSCell within the SCG. The MeNB does not change the content of the RRC configuration provided by the SeNB.

In the description, we assume that the SeNB provides the RRC configuration values in the small cell for the dual connection UE to the MeNB, and that the MeNB performs the RRC configuration or RRC reconfiguration procedure for the UE based on the RRC configuration values provided for the small cell side connection from the SeNB.

Hereinafter, what is related to a small cell addition procedure in a heterogeneous network as proposed herein is described in greater detail.

First, what is related to offloading and the terms used herein are briefly described.

Cell: combination of downlink and optionally uplink resources. The linking between the carrier frequency of the downlink resources and the carrier frequency of the uplink resources is indicated in the system information transmitted on the downlink resources.

Cell Group (CG): in dual connectivity, a group of serving cells associated with either the MeNB or the SeNB Dual Connectivity (DC): mode of operation of a UE in RRC_CONNECTED, configured with a Master Cell Group and a Secondary Cell Group.

E-RAB (E-UTRAN Radio Access Bearer): an E-RAB uniquely identifies the concatenation of an S1 Bearer and the corresponding Data Radio Bearer. When an E-RAB exists, there is a one-to-one mapping between this E-RAB and an EPS bearer of the Non Access Stratum as defined in 3GPP TS 23.401: "Technical Specification Group Services and System Aspects; GPRS enhancements for E-UTRAN access".

Master Cell Group (MCG): in dual connectivity, a group of serving cells associated with the MeNB, comprising of the PCell (Primary SCell) and optionally one or more SCells.

Master eNB (MeNB): in dual connectivity, the eNB which terminates at least S1-MME.

MCG bearer: in dual connectivity, radio protocols only located in the MeNB to use MeNB resources only.

SCG bearer: in dual connectivity, radio protocols only located in the SeNB to use SeNB resources.

Secondary Cell Group (SCG): in dual connectivity, a group of serving cells associated with the SeNB. comprising of PSCell and optionally one or more SCells Secondary eNB (SeNB): in dual connectivity, the eNB that is providing additional radio resources for the UE but is not the Master eNB.

Split bearer: in dual connectivity, radio protocols located in both the MeNB and the SeNB to use both MeNB and SeNB resources.

Offloading Procedure

The offloading procedure is defined as the consecutive operation that UE served by an eNB makes a dual connection with the small cell operated by another eNB.

Opening a dual connection is the work to make additional paths from the eNB to UE via the small cell. At the same time, it is the procedure of the eNB to pass its traffic to the small cell as well. Therefore it has the characteristics of both the handover procedure and the E-RAB management procedure.

The offloading procedure may be used to provide radio resources from the SeNB to the terminal. That is, the offloading procedure may mean a procedure of adding a new SeNB to add a SCG bearer/split bearer or small cell group (SCG) or one or more small cells. Further, even when dual connection has been already established between the macro cell and the small cell, the offloading procedure may mean a procedure of adding an E-RAB(s) (e.g., SCG bearer or split bearer) to the SeNB or a new SCG or one or more small cells.

FIG. 16 is a flowchart illustrating a small cell addition-related procedure as proposed herein.

The small cell addition procedure may be represented as an SeNB addition procedure. Further, the radio resource configuration may be represented as RRC (Radio Resource Control) configuration.

The SeNB Addition procedure is initiated by the MeNB and is used to establish a UE context at the SeNB in order to provide radio resources from the SeNB to the UE.

First, the terminal sends a measurement report to the MeNB (S1610).

That is, the terminal measures the strength of received signals of the serving cell and neighbor cells to periodically report, or when the measured values meet the conditions given by the measurement configuration, the measurement event is triggered to transmit a measurement report to the MeNB.

Like the handover procedure, the MeNB may transfer a measurement configuration to the terminal to inform what measurement information the terminal should report. The measurement configuration may be provided to the terminal through the RRC connection reconfiguration message when the terminal configures RRC connection with the base station.

Further, the measurement configuration may include a measurement object, a reporting configuration, a measurement ID, a quantity configuration, and a measurement gap. For the specific description relating thereto, the above-described measurement and measurement report and FIG. 11 are referenced.

Here, if the small cell to be measured use the same carrier frequency as the macro cell (intra-frequency neighbor measurement), the terminal may measure the small cell without a measurement gap. However, in case the small cell uses a different carrier frequency from the macro cell (inter-frequency neighbor measurement), the measurement gap may be used to sync with the neighbor cell's frequency during the UL/DL period, thus measuring the neighbor cell.

Thereafter, the MeNB sends a small cell addition request to the SeNB (S1620). The small cell addition request message may be represented as an SeNB addition request message.

Before performing step S1620, the MeNB may determine whether the SeNB requests the terminal to assign a radio resource, i.e., whether to off-load the terminal's traffic to the SeNB, based on the information contained in the MEASUREMENT REPORT message received from the terminal (e.g., information on the signal strength of the neighbor cell, the terminal's radio resource management (RRM) information, etc.).

Further, the MeNB may determine a target eNB (i.e., SeNB) as to the SeNB to which off-loading is to be performed based on the neighbor cell list information managed by the MeNB.

The small cell addition request message may be represented as an off-loading request message, an SeNB addition request message, or an SCG addition request message.

Further, the small cell addition request message may contain UE context information or RRC context information.

Here, the MeNB may request that the SeNB assign a radio resource to the terminal for adding a specific E-RAB (i.e., SCG bearer). In this case, the MeNB may indicate E-RAB characteristics through the small cell addition request message in order to request the addition of SCG bearer.

Here, the E-RAB characteristics may contain E-RAB parameters, transport network layer (TNL) address information, MeNB radio resource-related information, and the terminal (radio) capabilities.

That is, when MeNB adds a small cell or modifies UE bearers allocated for its small cell, MeNB provides SeNB the separated UE capability remained after MeNB determines the RRC configuration for the macro cell, which is generated by MeNB.

When MeNB adds a small cell or modifies UE bearers allocated for its small cell, it provides the RRC configuration results for the macro cell. By considering this information, SeNB may decide the RRC configuration for the small cell so that the overall RRC configurations for the macro cell and the small cell do not exceed the UE capability.

The SeNB, when able to assign a radio resource to the terminal, may perform admission control based on the received small cell addition request message.

Further, the SeNB may configure a radio resource by referring to E-RAB QoS parameter information and Bearer Split/Bearer Split Portion information. Specifically, in case a request for addition of an SCG bearer is sent from the MeNB, the SeNB may assign a radio resource to the terminal considering the received E-RAB QoS parameter information. In contrast, in case a request for addition of a split bearer is sent from the MeNB, the SeNB may assign a radio resource to the terminal according to a ratio of traffic allowed (or imposed) to the small cell considering the bearer split portion information as well as the received E-RAB QoS parameter information.

The SeNB may configure a transport bearer for transmitting uplink/downlink traffic of the terminal. The SeNB may reserve C-RNTI, and if the terminal needs syncing with the small cell, it may also reserve an RACH preamble.

Thereafter, the SeNB transmits a small cell addition ACK (Acknowledge) as a positive response to the small cell addition request message to the MeNB (S1630). The small cell addition ACK may be represented as an SeNB addition request ACK (Acknowledge).

Here, the small cell addition ACK may contain information on the new radio resource configuration determined by the SeNB or transparent container to be transmitted to the terminal. That is, the SeNB may transmit the assistance information for small cell RRC configuration to the MeNB through the small cell addition ACK.

Then, the MeNB identifies whether the RRC configuration for offloading or dual connectivity is proper based on the received small cell addition ACK.

The MeNB checks whether the RRC configuration values in the small cell side exceed the UE capability or violate the RRC configuration policy of the MeNB in consideration of the RRC configuration in the macro cell for the dual connection UE.

Thereafter, the MeNB transmits a small cell addition cancelation message or RRC configuration complete message to the SeNB according to the result of identification. The small cell addition cancelation message may be represented as an SeNB addition cancelation message, and the RRC configuration complete message may be represented as an SeNB reconfiguration complete message.

That is, in case as the result of identification the RRC configuration is determined to be not proper, the MeNB sends a small cell addition cancelation message to the SeNB (S1650).

In case as the result of identification the RRC configuration is determined to be proper, steps S1660 to S1680 are performed.

That is, the MeNB sends the RRC reconfiguration message to the terminal in order to apply the new RRC configuration to the terminal (S1660).

The RRC reconfiguration message may contain small cell configuration information assigned by the SeNB. The small cell configuration information means new radio resource configuration information for a specific E-RAB.

Thereafter, the terminal starts to apply the new RRC reconfiguration according to the RRC reconfiguration message received from the MeNB and sends to the MeNB an RRC (connection) reconfiguration complete message to inform that the RRC reconfiguration has been successfully complete (S1670).

Then, the MeNB sends to the SeNB an RRC configuration complete message to inform that the terminal's RRC reconfiguration has been complete (S1680).

After step S1680, the MeNB may perform data forwarding to the SeNB and may transfer packet data on the terminal to the SeNB.

Here, the MeNB may perform the data forwarding when sending the RRC (connection) reconfiguration message to the terminal or receiving the small cell addition ACK from the SeNB.

Further, in case the terminal need syncing with the cell of the SeNB, the data forwarding may be performed after the syncing procedure (e.g., random access procedure) between the terminal and the SeNB is complete.

When a plurality of small cells is (closely) deployed in a specific area in a heterogeneous network environment, that is, a network environment in which a macro cell (or MeNB) and a small cell (SeNB) coexist, use cases as illustrated in FIGS. 16, 17 and 18 may be generated.

Path change problems relating to packet data transmission, which can be generated in the use cases of FIGS. 16, 17 and 18, will now be described with reference to FIGS. 19, 20 and 21 and methods for solving the problems will now be described with reference to FIGS. 22 to 25.

Use Case 1

FIG. 16 illustrates an example of a use case relating to service movement, to which methods provided by the present invention are applicable.

FIG. 16 shows an exemplary case in which a service provided to a UE through a specific small cell (or secondary eNB (SeNB)) is moved to another small cell and thus the other small cell continuously provides the service to the UE.

The use case illustrated in FIG. 16 may correspond to a SeNB (or small cell) change or modification procedure.

Accordingly, messages or information used in the SeNB change or modification procedure can be used as message or information used in steps of the procedure shown in FIG. 16.

Use case 1 may correspond to a small cell addition procedure for a small cell providing a new service and to a small cell release procedure for the existing small cell with respect to service movement.

That is, messages or information used in the SeNB addition procedure and SeNB release procedure can be used as messages or information used in the steps of the procedure shown in FIG. 16.

As shown in FIG. 16, the UE is provided with two services (service 1 and service 2) by macro eNB1 and small cell 1 according to dual connectivity (DC) operation.

That is, the UE receives service 1 from macro eNB1 and receives service 2 from small cell 1 (SeNB).

A phenomenon such as handover may occur between small cells according to UE movement in a specific environment, particularly, in an environment in which a large number of small cells is located within the coverage of macro eNB1.

Referring to FIG. 16, handover from small cell 1 to small cell 2 occurs according to UE movement and thus service 2 provided to the UE can be provided by small cell 2 instead of small cell 1.

Service 1 is continuously provided to the UE through macro eNB1 since the UE moves within the coverage of macro eNB1.

Furthermore, macro eNB1 is connected to small cell 1 (or SeNB1) and small cell 2 (SeNB2) through Xn interfaces.

Use Case 2

FIG. 17 illustrates an example of another use case relating to service movement, to which the methods provided by the present invention are applicable.

FIG. 17 shows an exemplary case in which some of services provided through a macro eNB are moved to a small cell and provided to a UE.

The procedure shown in FIG. 17 may correspond to the small cell or SeNB addition procedure.

Accordingly, messages or information used in the SeNB addition procedure can be used as messages or information used in the procedure of FIG. 17.

Referring to FIG. 17, the UE is provided with service 1 and service 2 by macro eNB1.

When a specific situation such as UE movement occurs, service 2 is moved from macro eNB1 to small cell 2. That is, the UE receives service 1 from macro eNB1 and receives service 2 from small cell 2.

Macro eNB1 is connected to small cell 2 through an Xn interface.

Use Case 3

FIG. 18 illustrates an example of another use case relating to service movement, to which the methods provided by the present invention are applicable.

FIG. 18 shows an exemplary case in which a service provided through a small cell is moved to a macro eNB and provided to a UE.

The procedure shown in FIG. 18 may correspond to the small cell or SeNB release procedure.

Accordingly, messages or information used in the SeNB release procedure can be used as messages or information used in the procedure of FIG. 18.

Referring to FIG. 18, the UE is provided with service 1 by macro eNB1 and provided with service 2 by small cell 1.

When a specific situation such as UE movement occurs, the UE receives both service 1 and service 2 from macro eNB1.

The specific situation may correspond to a case in which the UE moves and leaves the coverage of small cell 1.

Macro eNB1 is connected to small 1 through an Xn interface.

In use cases 1, 2 and 3 shown in FIGS. 16, 17 and 18, a service GW may not recognize service path change when a service is moved between SeNBs or between an SeNB and a macro eNB.

That is, the serving GW may not detect change of the eNB providing a service to the UE and thus cannot properly provide the service in the use cases.

Accordingly, it is necessary to newly define a procedure for notifying a serving GW of service movement when a service is moved to an SeNB or an MeNB.

FIGS. 19, 20 and 21 illustrate service path change problems generated when a service is moved between SeNBs or moved to an SeNB or an MeNB in the respective use cases.

FIG. 19 illustrates a service path change problem that can be generated in the use case of FIG. 16.

To enable the use case of FIG. 16 in a heterogeneous network environment, that is, to continuously support dual connectivity operation of the UE when a service provided by a specific small cell is moved to another small cell, it is necessary to solve the service path change problem illustrated in FIG. 19.

When a UE moves to a small cell in a heterogeneous network environment including the small cell, operations relating to service movement are controlled by a (source) macro eNB rather than a target eNB, and thus path change relating to service provision differs from path switch of X2 handover. Accordingly, the service path change problem needs to be solved.

That is, it is necessary to notify the serving GW of change of E-RAB.

Referring to FIG. 19, the serving GW provides packet data about service 1 to macro eNB1 (S1901) and macro eNB1 transmits the packet data about service 1 to the UE (S1902).

In addition, the serving GW provides packet data about service 2 to small cell 1 (SeNB1) (S1903) and small cell 1 transmits the packet data about service 2 to the UE (S1904).

Macro eNB1 transmits a measurement control signal to the UE (S1905) and the UE reports a measurement result to macro eNB1 on the basis of the received measurement control signal (S1906).

Refer to the aforementioned measurement, measurement report and FIG. 8 for detailed description relating to S1905 and S1906.

Macro eNB1 determines service movement for providing the service of small cell 1 through small cell 2 (S1907). That is, service related control is performed by macro eNB1, as described above.

Subsequently, macro eNB1 transmits a service request to small cell 2 for service movement with respect to service 2 provided to the UE by small cell 1 (S1908). Here, the service request is for handover with respect to part of services.

The service request relates to small cell (or SeNB) change (or modification) and may be represented as a small cell modification request, an SeNB modification request message, an SeNB change request message, an SeNB addition request message or the like.

Small cell 2 transmits service request ACK to macro eNB1 as a response to the received service request (S1909). The service request ACK may be transmitted to macro eNB1 as necessary.

The service request ACK may be represented as small cell modification ACK, SeNB modification request acknowledgement or SeNB Addition Request Acknowledge.

A procedure (procedure for solving the service path change problem) of notifying the serving GW of service movement when the service provided to the UE is moved from small cell 1 to small cell 2, as shown in FIG. 19, has not been defined.

Accordingly, the serving GW cannot recognize service movement and thus continuously transmits the packet data about service 2 to small cell 1.

FIG. 20 illustrates a service path change problem that can be generated in the use case of FIG. 17.

To enable the use case of FIG. 17, that is, to enable at least one service provided by the macro eNB to be moved to a small cell (or SeNB) and continuously provided to the UE, the service path change problem illustrated in FIG. 20 needs to be solved.

That is, it is necessary to define a procedure for notifying the serving GW of change of E-RAB.

Referring to FIG. 20, the serving GW provides packet data about service 1 and packet data about service 2 to macro eNB1 (S2001) and macro eNB1 transmits the packet data about service 1 and service 2 to the UE (S2002).

Detailed description of S2003 and S2004 is omitted since S2003 and S2004 correspond to S1905 and S1906 shown in FIG. 19.

Macro eNB1 determines movement of part of services provided to the UE to a small cell (S2005).

Subsequently, macro eNB1 transmits a service request to small cell 2 in order to enable service 2 from among the services provided to the UE to be moved to small cell 2 and continuously provided to the UE (S2006). Here, the service request is for handover of partial service.

In FIG. 20, small cell 2 (or SeNB) is added and the service request may be represented as a small cell addition request message or an SeNB addition request message.

Small cell 2 transmits service request ACK to macro eNB1 as a response to the received service request (S2007). The service request ACK may be transmitted to macro eNB1 as necessary.

The service request ACK may be represented as small cell addition ACK or SeNB addition acknowledgement.

In this case, a procedure for notifying the serving GW of service movement when the service provided to the UE is moved from the macro eNB to SeNB has not been defined.

Accordingly, the serving GW cannot recognize service movement from the macro eNB to SeNB and thus continuously transmits the packet data about service 2 to macro eNB1.

FIG. 21 illustrates a service path change problem that can be generated in the use case of FIG. 18.

To enable the use case of FIG. 18 in a heterogeneous network environment, that is, to enable a service provided by a small cell to be moved to the macro eNB and continuously provided to the UE, the service path change problem shown in FIG. 21 needs to be solved.

That is, it is necessary to define a procedure for notifying the serving GW of change of E-RAB.

Referring to FIG. 21, the serving GW provides packet data about service 1 to macro eNB1 (S2101) and macro eNB1 transmits the packet data about service 1 to the UE (S2102).

In addition, the serving GW provides packet data about service 2 to small cell 1 (S2103) and small cell 1 transmits the packet data about service 2 to the UE (S2104).

Detailed description of S2105 and S2106 is omitted since S2105 and S2106 correspond to S1905 and S1906 of FIG. 19.

Macro eNB1 determines service movement for enabling the service provided by small cell 1 to be provided through macro eNB1 (S2107).

Subsequently, macro eNB1 transmits a service deactivation message to small cell 1 to enable service 2 provided to the UE by small cell 1 to be moved to macro eNB1 (S2108). Here, the service deactivation message is used for service interruption in small cell 1.

The service deactivation message is for service release in the small cell and may be represented as a small cell release request message or an SeNB release request message.

Small cell 1 transmits service deactivation ACK to macro eNB1 as a response to the received service deactivation message (S2109). The service deactivation ACK may be transmitted to macro eNB1 as necessary.

The service deactivation ACK may be represented as an SeNB Release Request Acknowledge message.

In the case of FIG. 21, a procedure through which the serving GW can recognize service movement when the service provided by the small cell is moved to the macro eNB is not defined and thus the UE cannot be properly provided with the service even when the service is moved to the macro eNB.

That is, the serving GW continuously transmits the packet data about service 2 to small cell 1 since the serving GW cannot recognize service movement.

A description will be given of methods for notifying the serving GW of service movement in order to solve service path change problems generated in FIGS. 19, 20 and 21.

That is, methods for solving service path change problems generated in the serving GW will now be described.

Specifically, a method for solving service path change problems, which is applicable to the use cases, is described with reference to FIG. 22 and methods for solving the service path change problems in the use cases are described with reference to FIGS. 23, 24 and 25.

FIG. 22 is a flowchart illustrating an exemplary method for enabling service movement between eNBs in a heterogeneous network environment, which is provided by the present invention.

Upon determining that a service provided to a UE is moved between SeNBs, to an SeNB or to a macro eNB, the macro eNB transmits, to an MME, a small cell path information notify message for notifying the serving GW of service movement (S2201).

The representation of the small cell path information notify message is exemplary and the small cell path information notify message can replace a message or an information element (IE) of any type, which is transmitted by the macro eNB to notify the MME of service movement.

The small cell path information notify message may include E-RAB (E-UTRAN Radio Access Bearer) information and cell information relating to service movement, that is, the following information.

1. E-RAB to be switched in a downlink list
    E-RABs switched in downlink item IEs: E-RAB ID, transport layer address, GTP (General Packet Radio Service Tunneling Protocol)-TEID (Tunneling Endpoint Identifier)
The E-RAB ID represents E-RABs admitted to be added and the transport layer address indicates an IP address used for user plane transmission.

In addition, TEID indicates an identifier for identifying a tunnel endpoint.

2. Small cell ID (ID of a small cell providing the service prior to service switch)
3. Cell ID of a new small cell (ID of a small cell that newly provides the service after service switch)
4. Indication for notifying MME that a path switch request message is small cell path switch information if the path switch request message is used.

The small cell path information notify message may be transmitted in a new message format or included as a new information element in an existing message and transmitted.

The MME transmits a user plane update request message for small cells to the serving GW in order to modify requested access bearers (S2202).

The user plane update request message may include information necessary to modify the requested access bearers. That is, the user plane update request message may include small cell ID prior to service movement and new cell ID after service movement for billing or other purposes.

Accordingly, bearer contexts can be modified and removed.

Subsequently, the serving GW transmits a response to the user plane update request message to the MME (S2203).

Then, the MME transmits a small cell path information notify response to the macro eNB as a response to the small cell path information notify message (S2204).

The small cell path information notify response may include the following E-RAB related information.

1. E-RAB to be switched in an uplink list
    E-RABs switched in uplink item IEs (used in case that EPC decides to change the uplink TEID etc.): E-RAB ID, transport layer address, GTP-TEID
2. E-RAB to be released list (used in case that EPC failed to perform user plane path switch for at least one): This information may be transmitted through other E-RAB related messages.

The small cell path information notify response may be transmitted in a new message format or included as a new information element in an existing message and transmitted.

In case the EPC decides to change the uplink termination point of the tunnels, it may include the E-RAB To Be Switched in Uplink List IE in the small cell path information notify response (New Message or new IE of the existing message) message to specify a new uplink transport layer address and uplink GTP-TEID for each respective E-RAB for which it wants to change the uplink tunnel termination point.

In case the EPC failed to perform the user plane path switch for at least one, but not all, of the E-RABs included in the E-RAB To Be Switched in Downlink List IE, the MME shall include the E-RABs it failed to perform user plane path switch in the small cell path information notify response (New Message or new IE of the existing message) E-RAB To Be Released List IE. In this case, the small cell shall release the corresponding data radio bearers, and the small cell shall regard the E-RABs indicated in the E-RAB To Be Released List IE as being fully released.

The macro eNB transmits an E-RAB information notify message to the SeNB (small cell) (S2205).

The E-RAB information notify message may include the following information relating to E-RAB information.

1. E-RAB to be changed in an uplink list
    E-RABs changed in uplink item IEs (used in case that EPC decides to change the uplink TEID etc.): E-RAB ID, transport layer address, GTP-TEID
2. E-RAB to be released list
    used in case that EPC failed to perform user plane path switch for at least one, This information can also be transferred by other E-RAB related message such as SeNB Modification message or SeNB Release message.

The E-RAB information notify message may be transmitted in a new message format or included as a new information element in an existing message and transmitted.

The E-RAB information notify message may not be transmitted in use case 3 shown in FIG. 18.

A small cell updates TEID for each E-RAB on the basis of notification of E-RAB to be changed in the uplink list.

In addition, the small cell releases a corresponding data radio bearer in E-RAB to be released list IE and considers that E-RABs indicated by the E-RAB to be released list IE have been completely released.

A method for solving service path change problem in use case 1, that is, when a service is moved from a specific small cell to another small cell, will now be described with reference to FIG. 23.

FIG. 23 is a flowchart illustrating an exemplary method for performing service movement to another small cell in a heterogeneous network environment, which is provided by the present invention.

Detailed description of S2301 to S2309 is omitted since S2301 to S2309 correspond to S1901 to S1909 of FIG. 19.

After S2309, macro eNB1 transmits, to small cell 1 (or SeNB1), indication for deactivation of a service provided by small cell 1 to the UE (S2310).

The indication may be a service deactivation message, an SeNB release request message or an information element in the service deactivation message.

The indication may be transmitted in the form of an independent message or information element, such as a data forwarding request message or data forwarding request information element.

The information may be an end marker generated by macro eNB1.

Referring to FIG. 23, the service deactivation message is transmitted as the indication for service deactivation of small cell 1.

Subsequently, S2311 to S2315 are performed to notify the serving GW of service movement from small cell 1 to small cell 2. Detailed description of S2311 to S2315 is omitted since S2311 to S2315 correspond to S2201 to S2205 of FIG. 22.

A method for solving a service path change problem in use case 2, that is, when at least one service of the macro eNB is moved to an SeNB cell will now be described with reference to FIG. 24.

FIG. 24 is a flowchart illustrating an exemplary method for performing service movement from the macro eNB to a small eNB in a heterogeneous network environment, which is provided by the present invention.

Detailed descriptions of S2401 to S2406 and S2408 to S2412 are omitted since S2401 to S2406 correspond to S2001 to S2006 of FIG. 20 and S2408 to S2412 correspond to S2201 to S2205 of FIG. 22.

After S2406, small cell 2 (or SeNB2) transmits service request ACK to macro eNB1 as a response to service request (S2407).

The service request ACK is a message relating to a procedure for adding a small cell to perform service in the small cell, as described above, and may be represented as small cell addition ACK or SeNB addition acknowledgement.

In addition, the service request ACK includes information relating to E-RAB to be changed in the downlink list in order to continuously provide, through small cell 2, the service provided by small cell 1 to the UE.

The E-RAB related information relates to E-RAB information elements to be changed in the downlink list and may include at least one of E-RAB ID for identifying (indicating) E-RAB, transport layer address and GTP (General Packet Radio Service Tunneling Protocol)-TEID (Tunneling Endpoint Identifier).

The small cell path information notify message transmitted in S2408 includes cell ID of macro eNB1 instead of cell ID of the small cell providing the service after service switching although the small cell path information notify message corresponds to the information in S2201 of FIG. 22.

A method for solving a service path change problem in use case 3, that is, when a service is moved from a small eNB to the macro eNB (or when a service is returned to the macro eNB), will now be described with reference to FIG. 25.

FIG. 25 is a flowchart illustrating an exemplary method for performing service movement from a small eNB to the macro eNB in a heterogeneous network environment, which is provided by the present invention.

Detailed descriptions of S2501 to S2508 and S2510 to S2513 are omitted since S2501 to S2508 correspond to S2101 to S2108 of FIG. 21 and S2510 to S2513 correspond to S2201 to S2204 of FIG. 22.

After S2508, small cell 1 (or SeNB1) transmits service deactivation ACK indicating end of small cell service to macro eNB1 as a response to service deactivation (S2509). The service deactivation ACK may be transmitted as necessary.

Subsequently, S2510 to S2513 are performed to notify the serving GW of service movement from small cell 1 to macro eNB1. S2510 to S2513 correspond to S2201 to S2204 of FIG. 22.

The small cell path information notify message transmitted in S2510 includes cell ID of macro eNB1 instead of cell ID of the small cell providing the service after service switch although the small cell path information notify message corresponds to the information in S2201 of FIG. 22.

FIG. 26 is a block diagram illustrating a wireless device in which methods as proposed herein may be implemented.

Here, the wireless device may be a base station and a UE, and the base station includes both a macro base station and a small base station.

As shown in FIG. 19, the base station 2610 and the UE 2620 include communication units (transmitting/receiving units, RF units, 2613 and 2623), processors 2611 and 2621, and memories 2612 and 2622.

The base station and the UE may further input units and output units.

The communication units 2613 and 2623, the processors 2611 and 2621, the input units, the output units, and the memories 2612 and 2622 are operatively connected with each other in order to conduct the methods as proposed herein.

The communication units (transmitting/receiving units or RF units, 2613 and 2623), when receiving information created from a PHY (Physical Layer) protocol, transfer the received information through RF (Radio Frequency) spectrums and conduct filtering and amplification, then transmit the results through antennas. Further, the communication units transfer RF (Radio Frequency) signals received through the antennas to bands processable by the PHY protocol and perform filtring.

However, the communication units may also include the functions of switches to switch transmitting and receiving functions.

The processors 2611 and 2621 implement functions, procedures, and/or methods as proposed herein. The layers of radio interface protocols may be implemented by the processors.

The processors may be represented as control parts, controllers, control units, or computers.

That is, the processor is characterized to control sending to the second base station a small cell addition request message to request that the second base station assign a radio resource for a specific E-RAB (E-UTRAN Radio Access Bearer), receiving from the second base station an ACK responsive to the small cell addition request message, sending to the terminal an RRC reconfiguration message so that the terminal applies new radio resource configuration, receiving from the terminal an RRC reconfiguration complete message informing that the terminal's radio resource reconfiguration has been complete, and sending to the second base station an RRC configuration complete message to inform that the terminal's radio resource reconfiguration has been successfully complete.

Further, the processor is characterized to control receiving from the first base station a small cell addition request message for requesting that the second base station assign a radio resource for a specific E-RAB (E-UTRAN Radio Access Bearer), assigning a radio resource for the specific E-RAB based on the received small cell addition request message, sending to the first base station an ACK responsive to the small cell addition request message, and receiving from the first base station an RRC configuration complete message to inform that the terminal's radio resource reconfiguration has been successfully complete.

The memories 2612 and 2622 are connected with the processors to store protocols or parameters for performing the small cell addition procedure.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the small cell addition procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Further, the recording media readable by the processor may be distributed to computer systems connected with each other via a network, and processor readable codes may be stored and executed in a distributing manner.

This disclosure lies in utilizing a small cell addition procedure in a heterogeneous network.

INDUSTRIAL APPLICABILITY

Dual connectivity (DC) operations are used in a heterogeneous network (HN).

The invention claimed is:

1. A method for performing dual connectivity operation by a first eNB in a heterogeneous network, the method comprising:
    performing a second eNB addition procedure for establishing a connection between a second eNB and a user equipment (UE) for a specific E-UTRAN Radio Access Bearer (E-RAB);
    wherein the second eNB procedure comprises:
    transmitting a first message for requesting an addition of the second eNB to the second eNB;
    receiving a response for the first message from the second eNB; and
    transmitting a second message related to a user plane (UP) path update to a mobility management entity (MME),
    wherein the second message includes an E-RAB ID field indicating at least one E-RAB to be changed and indication information for informing the MME that the second message is information for the UP path update.

2. The method of claim 1, further comprising:
    exchanging packet data with a serving gateway;
    exchanging the packet data with the UE; and
    performing a measurement procedure with the UE.

3. The method of claim 1, further comprising determining moving of at least one of services provided to the UE to the second eNB.

4. The method of claim 1, further comprising:
    determining moving of a service of the second eNB to another second eNB; and
    transmitting a third message requesting service deactivation or release to the second eNB,
    wherein the third message is transmitted only after the request to the target new second eNB is accepted.

5. The method of claim 1, further comprising:
    determining moving of a service of the second eNB to the first eNB; and
    transmitting a fourth message requesting service deactivation or release to the second eNB.

6. The method of claim 1, wherein the first message is a service request message or a secondary eNB (SeNB) addition request message and the response to the first message is service request ACK or SeNB addition acknowledgement.

7. The method of claim 1, further comprising:
    receiving a response for the second message from the MME.

8. The method of claim 7, wherein the second message includes at least one of an identifier (ID) of a cell or an eNB providing a service after service movement or an identifier ID of a cell or an eNB providing a service prior to service movement.

9. The method of claim 8, wherein the response for the second message includes at least one of an E-RAB ID field indicating at least one E-RAB changed in the E-RAB ID field included in the second message or an E-RAB list including at least one E-RAB to be released.

10. The method of claim 9, wherein the response for the second message further includes an E-RAB list including at least one E-RAB failed to be changed among the E-RAB field included in the second message.

11. The method of claim 9, further comprising:
    transmitting a third message to the second eNB,
    wherein the third message includes at least one of an E-RAB ID field indicating at least one E-RAB changed in the E-RAB ID field included in the second message or an E-RAB list including at least one E-RAB to be released.

12. The method of claim 7, wherein
    the second message is a small cell path information notify message or a E-RAB Modification Indication message and the response to the second message is a small cell path information notify response message or E-RAB Modification Confirm message.

13. The method of claim 1, the first eNB is an MeNB (Master eNB) and the second eNB is an SeNB (Secondary eNB).

14. The method of claim 1, wherein the response for the first message includes an E-RAB ID field indicating an E-RAB (E-UTRAN Radio Access Bearer).

15. A radio apparatus that performs dual connectivity operation in a heterogeneous network, the radio apparatus comprising:
    a communication unit that transmits and/or receives a radio signal; and
    a processor functionally connected with the communication unit,
    wherein the processor:
    performs a second eNB addition procedure for establishing a connection between a second eNB and a user equipment (UE) for a specific E-UTRAN Radio Access Bearer (E-RAB),
    wherein the second eNB addition procedure comprises:
    transmitting a first message for requesting an addition of the second eNB to the second eNB;
    receiving a response for the first message from the second eNB; and
    transmitting a second message related to a user plane (UP) path update to mobility management entity (MME),
    wherein the second message includes an E-RAB ID field indicating at least one E-RAB and indication information for informing the MME that the second message is information for the UP path update.

16. The radio apparatus of claim 15, wherein the processor controls the communication unit to receive a response for the second message to the MME.

17. The radio apparatus of claim 16, wherein the response for the second message includes at least one of an E-RAB ID field indicating at least one E-RAB changed in the E-RAB ID field included in the second message or an E-RAB list including at least one E-RAB to be released.

18. The radio apparatus of claim 17, wherein the response for the second message further includes an E-RAB list including at least one E-RAB failed to be changed among the E-RAB field included in the second message.

19. The radio apparatus of claim 15, wherein the response for the first message includes an E-RAB ID field indicating an E-RAB (E-UTRAN Radio Access Bearer).

* * * * *